US008565596B2

(12) United States Patent
Tajima et al.

(10) Patent No.: US 8,565,596 B2
(45) Date of Patent: Oct. 22, 2013

(54) APPARATUS FOR SUPPORTING DESIGNING OF OPTICAL NETWORK, PROCESS FOR DESIGNING OPTICAL NETWORK, AND COMPUTER-READABLE, NON-TRANSITORY MEDIUM STORING NETWORK DESIGN PROGRAM

(75) Inventors: Kazuyuki Tajima, Kawasaki (JP);
Tomohiro Hashiguchi, Kawasaki (JP);
Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 13/032,698

(22) Filed: Feb. 23, 2011

(65) Prior Publication Data
US 2011/0206371 A1    Aug. 25, 2011

(30) Foreign Application Priority Data
Feb. 25, 2010    (JP) .................................. 2010-039726

(51) Int. Cl.
*H04B 10/2513*    (2013.01)
(52) U.S. Cl.
USPC ............................................ 398/29; 398/147
(58) Field of Classification Search
USPC .............................................. 398/29, 41, 147
See application file for complete search history.

(56) References Cited

U.S. PATENT DOCUMENTS

2005/0185967 A1*   8/2005   Hoshida ........................ 398/173
2013/0039651 A1*   2/2013   Sadananda et al. ............. 398/26

FOREIGN PATENT DOCUMENTS

| JP | 2010-081284 A | 4/2010 |
| WO | WO 2005/006604 | 1/2005 |
| WO | WO 2005/032076 | 4/2005 |

OTHER PUBLICATIONS

Bhandari, Ramesh "Optical Physical Diversity Algorithms and Survivable Networks", Proceedings of the 2nd IEEE Symposium on Computers and Communications (ISCC '97) Jul. 1997, pp. 433-441.
Sakawa, Masatoshi "Optimizations of Discrete Systems", Sections 4 & 5 May 2000, pp. 33-84, concise explanation.

* cited by examiner

*Primary Examiner* — Leslie Pascal
(74) *Attorney, Agent, or Firm* — Fujitsu Patent Center

(57) ABSTRACT

In an apparatus for supporting designing of an optical network including a plurality of nodes and links which connect the plurality of nodes: a storage stores information indicating distances of the links and information indicating amounts of chromatic dispersion in the links; and a path selection unit selects a path for use in transmission of an optical signal, from among a plurality of paths each extending from a start node to a destination node, by reference to the storage. The path selection unit selects the path for use in transmission on the basis of deviations of amounts of chromatic dispersion accumulated by transmission to respective nodes on each of the plurality of paths, from reference amounts at the respective nodes, and the reference amounts at the respective nodes on each of the plurality of paths are determined according to distances from the start node to the respective nodes.

14 Claims, 24 Drawing Sheets

NETWORK-
INFORMATION TABLE  121

| Input Point | Output Point | Distance [km] | Dispersion [ps/nm] | Compensation [ps/nm] |
|---|---|---|---|---|
| $n_s$ | n1 | 20 | 340 | −290 |
| $n_s$ | n3 | 15 | 255 | −190 |
| n1 | n2 | 20 | 340 | −300 |
| n1 | n3 | 15 | 255 | −185 |
| n1 | n5 | 15 | 255 | −200 |
| n2 | $n_d$ | 20 | 340 | −280 |
| n2 | n4 | 15 | 255 | −200 |
| n2 | n6 | 15 | 255 | −190 |
| n3 | n4 | 15 | 255 | −195 |
| n5 | n6 | 30 | 510 | −380 |
| n6 | $n_d$ | 10 | 170 | −130 |
| ⋮ | ⋮ | ⋮ | ⋮ | ⋮ |

FIG. 7

PATH ERROR TABLE 151

| Path | Error (Absolute Value) [ps/nm] | | | | | |
|---|---|---|---|---|---|---|
| | #1 | #2 | #3 | #4 | #5 | #6 |
| 1 | n1 = 30 | n2 = 70 | $n_d$ = 90 | | | |
| 2 | n1 = 30 | n2 = 70 | n6 = 65 | $n_d$ = 65 | | |
| 3 | n1 = 30 | n3 = 20 | n4 = 20 | n2 = 25 | $n_d$ = 45 | |
| 4 | n1 = 30 | n3 = 20 | n4 = 20 | n2 = 25 | n6 = 20 | $n_d$ = 20 |
| 5 | n1 = 30 | n5 = 35 | n6 = 25 | $n_d$ = 25 | | |
| 6 | n1 = 30 | n5 = 35 | n6 = 25 | n2 = 20 | $n_d$ = 40 | |
| 7 | n3 = 5 | n1 = 15 | n2 = 25 | $n_d$ = 45 | | |
| 8 | n3 = 5 | n1 = 15 | n2 = 25 | n6 = 20 | $n_d$ = 20 | |
| 9 | n3 = 5 | n1 = 15 | n5 = 10 | n6 = 20 | $n_d$ = 20 | |
| 10 | n3 = 5 | n1 = 15 | n5 = 10 | n6 = 20 | n2 = 25 | $n_d$ = 5 |
| 11 | n3 = 5 | n4 = 5 | n2 = 0 | $n_d$ = 10 | | |
| 12 | n3 = 5 | n4 = 5 | n2 = 0 | n6 = 5 | $n_d$ = 5 | |

FIG. 11

SPAN ERROR TABLE  152

| Input Point | Output Point | Error [ps/nm] |
|---|---|---|
| $n_s$ | n1 | −30 |
| $n_s$ | n3 | +5 |
| n1 | n2 | −40 |
| n1 | n3 | +10 |
| n1 | n5 | −5 |
| n2 | $n_d$ | −20 |
| n2 | n4 | −5 |
| n2 | n6 | +5 |
| n3 | n4 | 0 |
| n5 | n6 | +10 |
| n6 | $n_d$ | 0 |
| ⋮ | ⋮ | ⋮ |

FIG. 13

APPARATUS FOR SUPPORTING DESIGNING OF OPTICAL NETWORK, PROCESS FOR DESIGNING OPTICAL NETWORK, AND COMPUTER-READABLE, NON-TRANSITORY MEDIUM STORING NETWORK DESIGN PROGRAM

CROSS-REFERENCE TO RELATED APPLICATION

This application is based upon and claims the benefits of priority from the prior Japanese Patent Application No. 2010-039726, filed on Feb. 25, 2010, the entire contents of which are incorporated herein by reference.

FIELD

The embodiments discussed herein relate to an apparatus (network design apparatus) for supporting designing of an optical network, a process for designing an optical network, and a computer-readable, non-transitory medium storing a network design program for designing an optical network.

BACKGROUND

Currently, development of optical networks (especially core networks) for further increasing the transmission rate and the bandwidth is proceeding. In some cases, the optical networks using wavelength division multiplexing (WDM) are used. In the optical networks, chromatic dispersion (hereinafter, referred to simply as dispersion) can cause waveshape distortion during propagation of optical signals in optical fibers. The dispersion is a type of dispersion caused by the variations with the wavelength in the propagation speed of the optical signal through the optical fiber. The amount of dispersion varies with the length, material, and the like of the optical fiber through which the optical signal propagates.

The dispersion can cause bit errors when a destination node extracts information from an optical signal. The bit errors tend to increase with the total amount of dispersion accumulated until the optical signal reaches the destination (end) node. Therefore, in some optical networks, a dispersion compensation module (DCM) is arranged at the end point of the optical fiber or the like. The dispersion compensation module is an optical device which has an inverse characteristic to the dispersion characteristic of the optical fiber. For example, an optical fiber having the inverse characteristic can be used as the dispersion compensation module. The total amount of dispersion can be reduced when the optical signal passes through the dispersion compensation module.

Therefore, in many cases of designing an optical network, a bit error rate which is tolerable in the destination node (e.g., $10^{-15}$) is preset. In such cases, it is preferable to design the optical network in consideration of the tolerable bit error rate so that, whatever path the optical signal passes through, the total amount of dispersion at the destination node falls within a certain range. On the other hand, according to a method for designing dispersion compensation which is disclosed, for example, in the International Patent Publication No. WO2005/006604, the amounts of dispersion in dispersion compensation modules arranged in each path are set so that the total amount of dispersion in every path falls within a tolerance range which is preset as a transmittability condition.

According to a method for selecting an optimal path from among a plurality of paths which is disclosed, for example, in the International Patent Publication No. WO2005/032076, information on the transmission characteristics is accumulatively transmitted from a start node to a destination node, and the optimal path is determined on the basis of the accumulative information on the transmission characteristics received by the destination node. Specifically, a path for use in transmission of optical signals is selected from among a plurality of paths each extending from the start node to the destination node, in consideration of dispersion. However, according to the method disclosed in WO2005/032076, only the accumulative information on the transmission characteristics received by the destination node is considered. Therefore, there is room for improvement in transmission quality by suppressing distortion in the optical signal for the following reason.

In some optical networks, the optical signals are amplified by optical amplifiers at intermediate nodes. The optical amplifiers have nonlinear characteristics. Therefore, when an optical signal affected by a great amount of accumulated dispersion is amplified, a nonlinear component remains even after the optical signal passes through the dispersion compensation module, i.e., it is impossible to sufficiently compensate for the distortion. On the other hand, even when the amount of accumulated dispersion is extremely close to zero, nonlinear distortion occurs in the optical signal. This is because a strong nonlinear effect occurs when an optical signal the power of which is excessively focused is inputted from an optical amplifier into an optical fiber. Therefore, it is preferable to select a path in consideration of the condition of the optical signal in the entire path.

SUMMARY

According to an aspect of the present invention, an apparatus for supporting designing of an optical network including a plurality of nodes and a plurality of links which connect the plurality of nodes is provided. The apparatus includes: a storage which stores information indicating distances of the plurality of links and information indicating amounts of dispersion in the plurality of links; and a path selection unit which selects a path for use in transmission of an optical signal, from among a plurality of paths each extending from a start node to a destination node, by reference to the storage. The path selection unit selects the path for use in transmission on the basis of deviations of amounts of dispersion accumulated by transmission to respective nodes on each of the plurality of paths, from reference amounts at the respective nodes, and the reference amounts at the respective nodes on each of the plurality of paths are determined according to distances from the start node to the respective nodes.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWINGS

FIG. 7 indicates an example of a structure of a network information table;

FIG. 11 indicates an example of a structure of a path error table;

FIG. 13 indicates an example of a structure of a span error table;

DESCRIPTION OF EMBODIMENTS

The embodiments will be explained below with reference to the accompanying drawings, wherein like reference numbers refer to like elements throughout.

1. First Embodiment

Figure 1:
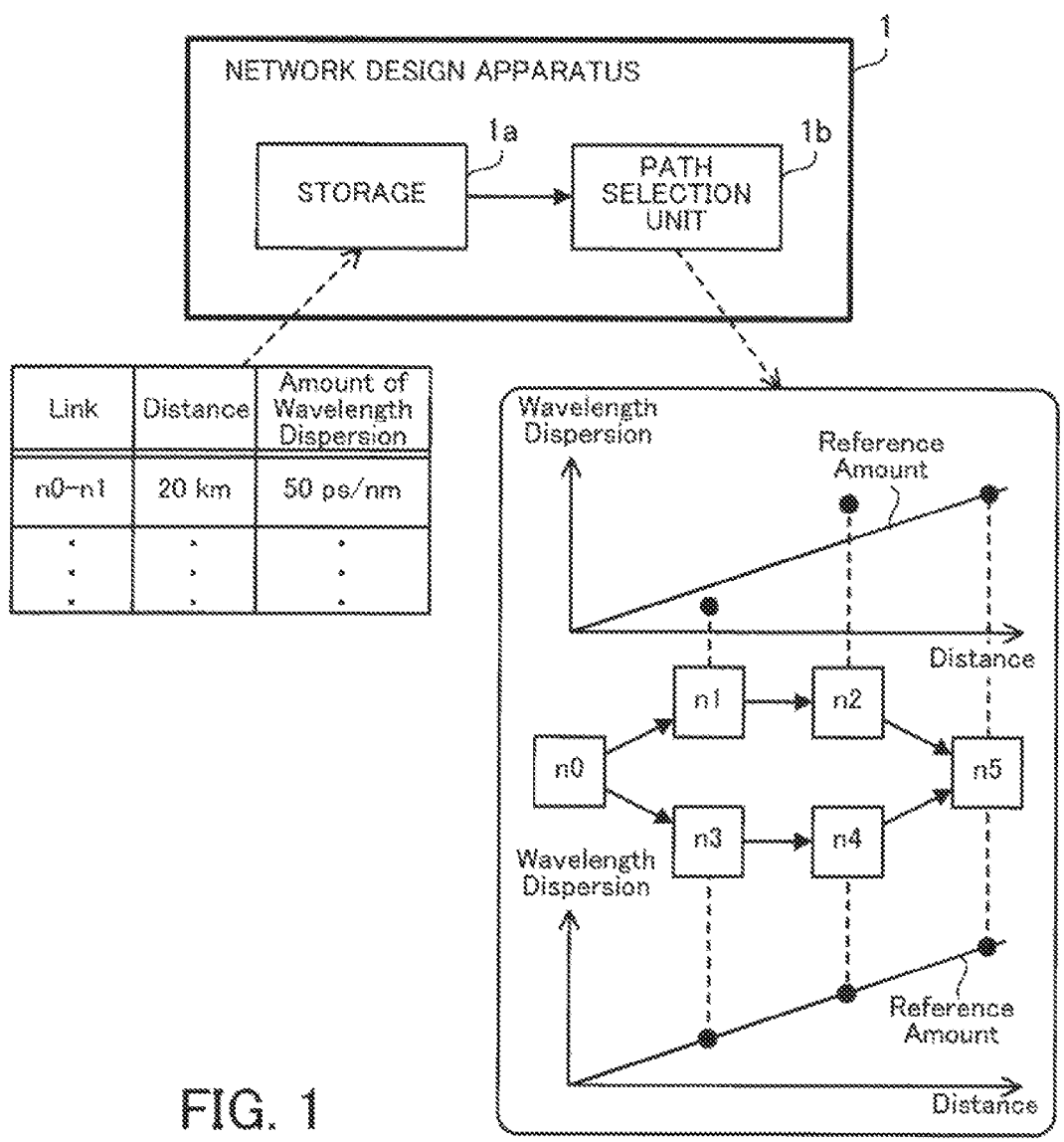
FIG. 1 illustrates an outline of a network design apparatus according to a first embodiment.

FIG. 1 illustrates an outline of the network design apparatus according to the first embodiment. The network design apparatus 1 supports designing of an optical network which contains a plurality of nodes and a plurality of links connecting the plurality of nodes. The network design apparatus 1 may be, for example, an administration apparatus used by an administrator of the optical network, or a computer which executes a predetermined network design program.

Consider selection of an appropriate path from among a plurality of paths each extending from a start node to a destination node by using the network design apparatus 1 under the condition that the topology of the optical network and the transmission characteristics of the respective links are given to the network design apparatus 1. The path selection can be performed on either an already constructed optical network or an optical network to be constructed. The start node and the destination node can be designated from among the plurality of nodes before the path is selected. The network design apparatus 1 comprises a storage 1a and a path selection unit 1b.

The storage 1a stores information indicating the distances of the plurality of links and information indicating the amounts of dispersion in the plurality of links. The information indicating the amounts of dispersion may contain information indicating the amount of dispersion in each optical fiber per se (i.e., the amount of dispersion caused by transmission of the optical signal through each optical fiber) and information indicating the amount of dispersion compensated for at an end (either of an input point and an output point) of each optical fiber by dispersion compensation. In this case, it is possible to calculate an actual amount of dispersion in each link on the basis of the amount of dispersion in the optical fiber per se and the amount of dispersion compensated for at an end of the optical fiber.

The path selection unit 1b selects a path for use in transmission of the optical signal, from among the plurality of paths each extending from the start node to the destination node, on the basis of the information stored in the storage 1a. Specifically, the path selection unit 1b calculates, for each node on each of the plurality of paths, the deviation of the amount of dispersion which is accumulated by transmission from the start node to the node on the path, from a reference amount which is determined according to the distance from the start node to the node on the path. Then, the path selection unit 1b selects a path for use in transmission of the optical signal, on the basis of the deviations calculated for the respective nodes on each of the plurality of paths.

For example, the path selection unit 1b calculates the amount of dispersion accumulated by transmission to each node through one or more links on each path by obtaining the sum of the amounts of dispersion in the one or more links, calculating a reference amount as the product of a reference value per unit distance and the sum of the distances of the one or more links, and calculating the deviation of the accumulated amount of dispersion from the reference amount. Alternatively, the path selection unit 1b may calculate the amount of dispersion accumulated by transmission to each node through one or more links on each path by calculating a link-based reference amount as the product of the distance of each of the one or more links and a reference value per unit distance, calculating the deviation of the amount of dispersion in each of the one or more links from the link-based reference amount in the link, and calculating the sum of the differences respectively calculated for the one or more links. The reference value per unit distance may be a fixed value, or a value calculated by use of the information stored in the storage 1a.

In addition, the path selection unit 1b, for example, selects as a characteristic value for each of the plurality of paths the maximum of the deviations calculated for the respective nodes on the path, and selects as the path for use in transmission of the optical signal one of the plurality of paths which has the smallest characteristic value. Instead of the maximum of the deviations, an average of the deviations may be used as the characteristic value. Alternatively, the path selection unit 1b may enumerate all the paths each extending from the start node to the destination node, perform calculation for obtaining a characteristic value of each of the plurality of paths, and compare the characteristic values of the plurality of paths. Further, the path selection unit 1b may search for the path in which the characteristic value is minimized, by using a search algorithm without enumerating all the paths each of which extends from the start node to the destination node.

Assume that there are two paths from the node n0 to the node n5, one which is denoted by n0-n1-n2-n5 passes through the nodes n1 and n2, and the other which is denoted by n0-n3-n4-n5 passes through the nodes n3 and n4, as illustrated in FIG. 1. In FIG. 1, the reference amount for the accumulated amount of dispersion is indicated by an inclined line in each of the graphs respectively arranged for the two paths. In the example of FIG. 1, the amount of dispersion accumulated through the path n0-n1-n2-n5 is equal to the amount of dispersion accumulated through the path n0-n3-n4-n5. However, the accumulated amounts of dispersion at the nodes n1 and n2 are deviated from the reference amounts at the distances of the nodes n1 and n2, while the accumulated amounts of dispersion at the nodes n3 and n4 are close to the reference amounts at the distances of the nodes n3 and n4. In the above case, the path selection unit 1b selects the path n0-n3-n4-n5 as the path for use in transmission of the optical signal.

As explained above, in the network design apparatus 1 according to the first embodiment, the information indicating the distances of the plurality of links and the information indicating the amounts of dispersion in the plurality of links are stored in the storage 1a. The path selection unit 1b selects the path for use in transmission of the optical signal, from among the plurality of paths each extending from the start node to the destination node, on the basis of the information stored in the storage 1a. Specifically, the path selection is performed on the basis of the deviation of the amount of dispersion accumulated during transmission from the start node to each node on each path extending from the start node to the destination node from the reference amount determined according to the distance from the start node to the node on the path extending from the start node to the destination node.

Therefore, it is possible to select a path capable of suppressing distortion in the optical signal, and improve transmission quality of the optical network. That is, according to the first embodiment, it is possible to select a path in which the accumulated amount of dispersion is close to the reference amount not only at the destination node and also at intermediate nodes. Therefore, the nonlinear distortion which can be caused when the dispersion is extremely great or close to zero at intermediate nodes can be suppressed.

Incidentally, the accumulated amount of dispersion can be negative. In this case, the effect of the first embodiment can be achieved by avoiding occurrence of extremely great or nearly zero magnitude of the dispersion.

2. Second Embodiment

2.1 Optical Network System

Figure 2:
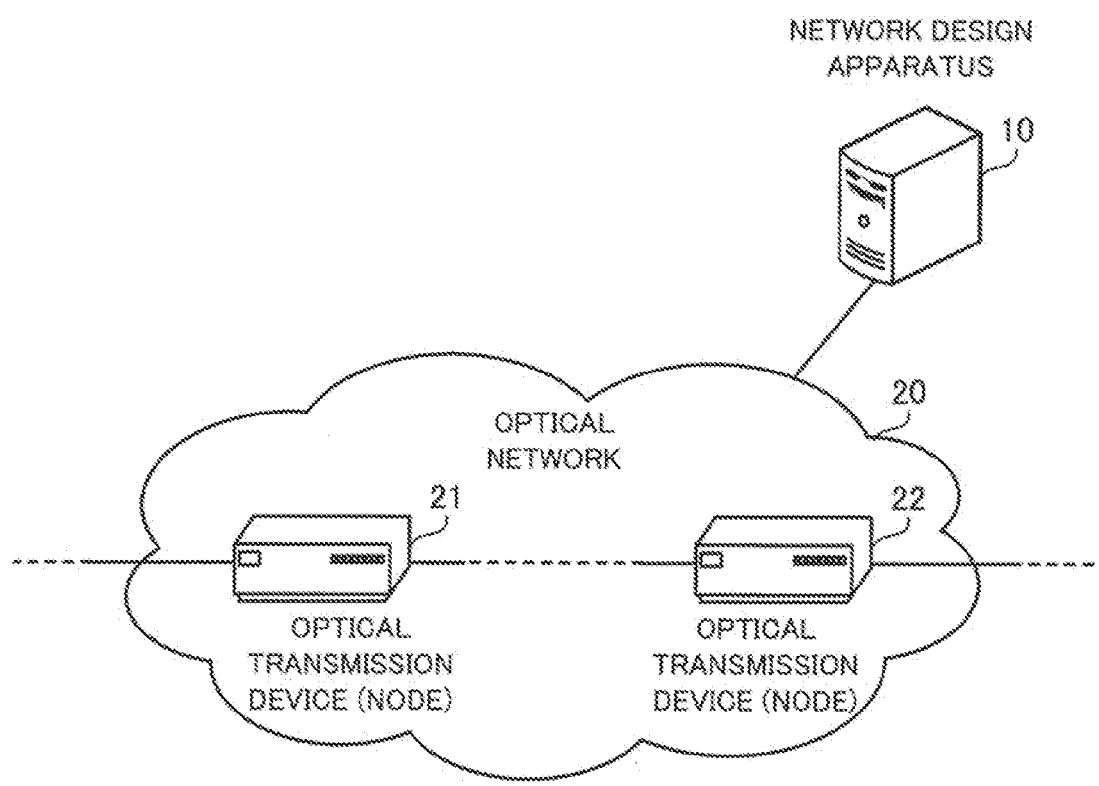
FIG. 2 schematically illustrates a configuration of an optical network system according to a second embodiment.

FIG. 2 schematically illustrates a configuration of the optical network system according to the second embodiment. The optical network system according to the second embodiment comprises a network design apparatus 10 and an optical network 20. The optical-network design apparatus 10 is connected to the optical network 20.

The network design apparatus 10 is a computer for administration, and is used by an administrator of the optical network 20. The network design apparatus 10 is also used for designing transmission paths of optical signals. The optical network 20 is a communication network in which optical signals are transmitted by wavelength division multiplexing. The optical network 20 contains a plurality of optical transmission apparatuses (nodes) including the optical transmission apparatuses 21 and 22. Each of the optical transmission apparatuses is connected to one or more other optical transmission apparatuses through one or more optical fibers, and a dispersion compensation module is provided in each of the optical transmission apparatuses. The dispersion compensation module is arranged at either of an input end and an output end of each optical fiber. However, in the following explanations, it is assumed that a dispersion compensation module is arranged at an output end of each optical fiber.

2.2 Variations in Dispersion

Figure 3:
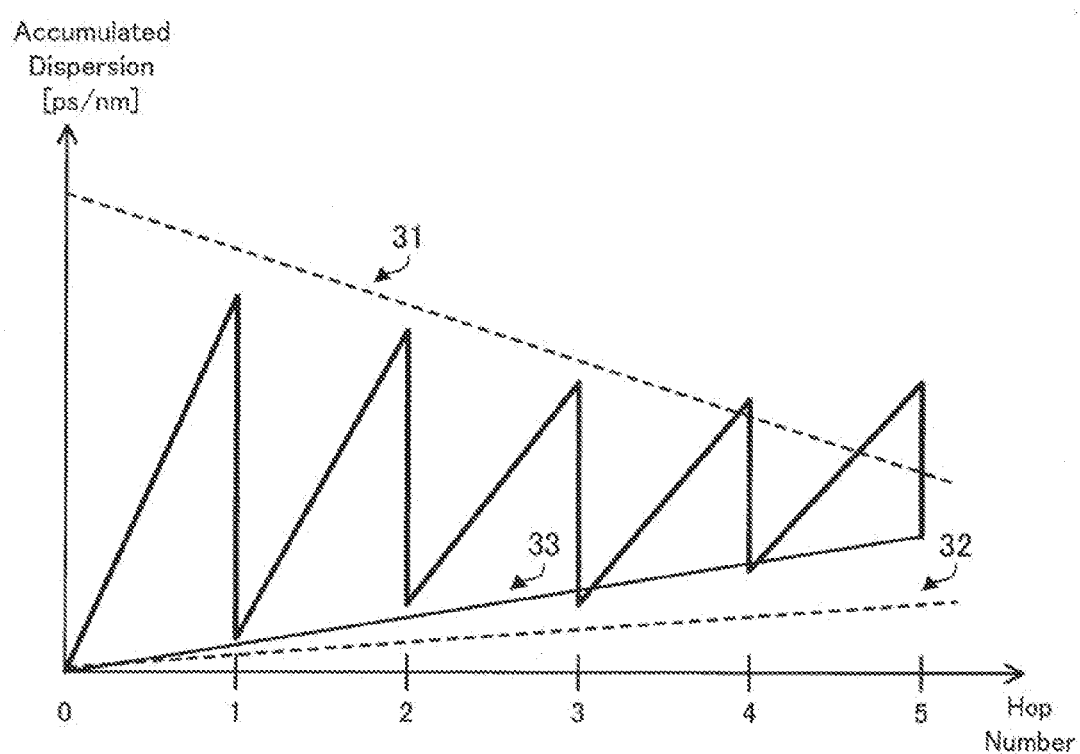
FIG. 3 indicates examples of variations in dispersion.

FIG. 3 indicates examples of variations in the dispersion. In the graph of FIG. 3, the abscissa corresponds to the hop number (the number of relaying nodes) from the start node, and the ordinate corresponds to the amount of accumulated dispersion which the optical signal suffer from. (Hereinafter, the accumulated dispersion may be referred to as the accumulated dispersion.) The amount of dispersion can be expressed in, for example, picosecond per nanometer (ps/nm). The amount of dispersion indicates the spread of pulses, i.e., the time lag (in picoseconds) in the timing of arrival per unit spectral width (in nanometers).

The accumulated dispersion increases in proportion with the transmission distance in the optical fiber until the optical signal reaches the node #1 corresponding to the hop number of one after the start node receives the optical signal. Since the dispersion compensation module is arranged at the reception end for the optical signal in each node, the accumulated dispersion is reduced by dispersion compensation when the optical signal reaches the node #1. However, in the example of FIG. 3, a positive (nonzero) amount of accumulated dispersion remains after the dispersion compensation in the node #1.

Similarly, the accumulated dispersion increases in proportion with the transmission distance in the optical fiber until the optical signal outputted from the node #1 reaches the node #2 corresponding to the hop number of two. The accumulated dispersion is reduced by dispersion compensation when the optical signal reaches the node #2. Similar to the node #1, in the example of FIG. 3, a positive (nonzero) amount of accumulated dispersion remains after the dispersion compensation in the node #2. Thereafter, increase and decrease in the accumulated dispersion are repeated until the optical signal reaches the node #5, which is the destination node and corresponds to the hop number of five.

The destination node extracts information from the received optical signal. In order to maintain the communication quality, it is preferable that the bit error rate at the destination node be at a certain level or lower (e.g., $10^{-15}$ or lower). Therefore, it is preferable that the accumulated dispersion at the destination node be within a certain tolerance range of the accumulated dispersion corresponding to a tolerable range of the bit error rate. Further, in order to suppress nonlinear distortion, it is preferable that the accumulated dispersion at each node on the path be neither excessively great nor close to zero.

For the reasons explained above, it is preferable that the accumulated dispersion slowly converge so that the accumulated dispersion caused by transmission of the optical signal from the start node to the destination node falls within the tolerance range of the accumulated dispersion corresponding to the tolerable range of the bit error rate. In FIG. 3, the dashed line 31 indicates the upper limit of the accumulated dispersion, and the dashed line 32 indicates the lower limit of the accumulated dispersion. It is desirable that the accumulated dispersion during the transmission both before and after dispersion compensation fall within the range between the upper and lower limits as long as possible. In addition, the line 33 is an ideal increasing straight line, which indicates that the final accumulated dispersion falls into the middle of the allowable range. It is also desirable that the accumulated dispersion after the dispersion compensation on each node on a path is close to the line 33.

However, the variations in the accumulated dispersion under a given condition of the amount of dispersion caused by transmission through the optical fiber and the amount of compensation made by the dispersion compensation module depend on the path through which the optical signal passes. That is, in the case where a plurality of paths each extending from the start node to the destination node exist, it is preferable to select one of the plurality of paths as a path for use in transmission of the optical signal so that the accumulated dispersion which varies during transmission through the path satisfies the above condition. Although the positive amounts of dispersion are gradually accumulated in the example of FIG. 3, alternatively, negative amounts of dispersion may be gradually accumulated. In the examples used in the following explanations, the amounts of dispersion are set in the respective dispersion compensation modules so that the accumulated dispersion is positive.

2.3 Hardware of Network Design Apparatus

Figure 4:
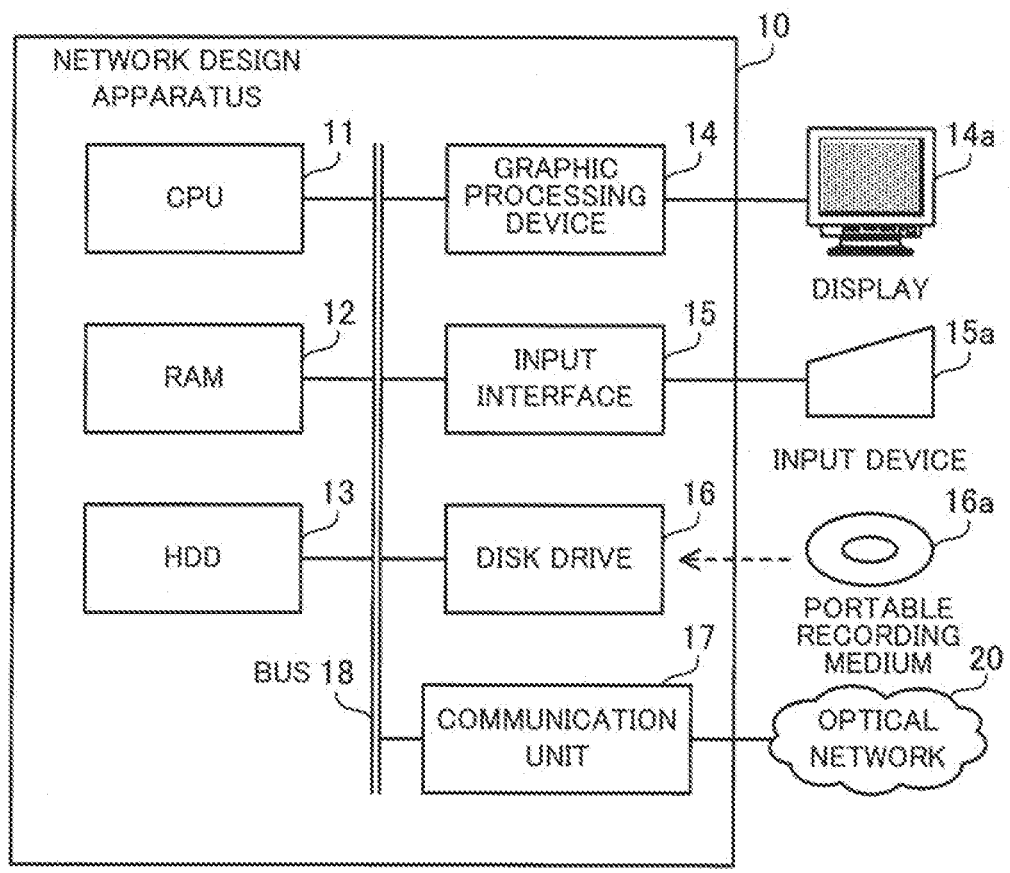
FIG. 4 indicates an exemplary hardware construction of the network design apparatus FIG. 5 indicates the functions of the network design apparatus according to the second embodiment.

FIG. 4 illustrates an exemplary hardware construction of the network design apparatus 10. The network design apparatus 10 comprises a CPU (central processing unit) 11, a RAM (random access memory) 12, an HDD (hard disk drive) 13, a graphic processing unit 14, an input interface 15, a disk drive 16, and a communication unit 17 which are connected through an internal bus 18. The CPU 11 controls the entire network design apparatus 10. In addition, the CPU 11 reads out a program stored in the HDD 13, loads the program on the RAM 12, and executes the program. For example, when the network design apparatus 10 is started, the CPU 11 starts execution of an OS (operating system) program. Thereafter, the CPU 11 executes a network design program in response to manipulation by a user. The RAM temporarily stores at least portions of programs which are executed by the CPU 11, as well as data necessary for processing by the CPU 11. The CPU 11 writes and reads data into and from the RAM 12 when necessary. Alternatively, another type of memory device may be used in place of or in combination with the RAM 12. The HDD 13 is an auxiliary storage device storing programs which can be executed by the CPU 11 and data which can be used in the processing performed by the CPU 11. The programs stored in the HDD 13 include the OS program and the network design program. Alternatively, another type of auxiliary storage device such as a solid-state drive (SSD) may be used in place of or in combination with the HDD 13.

A display 14a is connected to the graphic processing unit 14. The graphic processing unit 14 generates image signals for displaying a screen, under control of the CPU 11, and outputs the image signals to the display 14a. The screen displayed on the display 14a includes a screen for inputting network information and a screen for displaying a result of the path determination.

An input device 15a is connected to the input interface 15. For example, a keyboard, a mouse, a touchscreen, and the like can be used as the input device 15a. The input interface 15 detects the user manipulation made on the input device 15a, and outputs to the CPU 11 input signals corresponding to the manipulation.

The disk drive 16 is a drive device for reading programs and data from a portable recording medium 16a. For example, a magnetic disk such as a flexible disk (FD), an optical disk such as a CD (compact disk) or a DVD (digital versatile disk), and a magneto-optical disk (MO) can be use as the portable recording medium 16a. The network design program may be recorded in the portable recording medium 16a.

The communication unit 17 is connected to the optical network 20. The communication unit 17 performs communication with the optical transmission apparatuses (including the optical transmission apparatuses 21 and 22) under control of the CPU 11. For example, the communication unit 17 collects from the optical transmission apparatuses 21 and 22 control information which indicates the status of communication, and sends to the optical transmission apparatuses 21 and 22 a command to change the settings.

When the network design apparatus 10 as a computer having the above hardware construction executes a predetermined network design program, the network design apparatus 10 can perform the processing which will be explained below. Alternatively, the network design apparatus 10 can be realized by a dedicated device, instead of a versatile computer. In this case, the network design apparatus 10 may be implemented with dedicated circuits for performing the processing which will be explained below.

2.4 Functions of Network Design Apparatus

Figure 5:
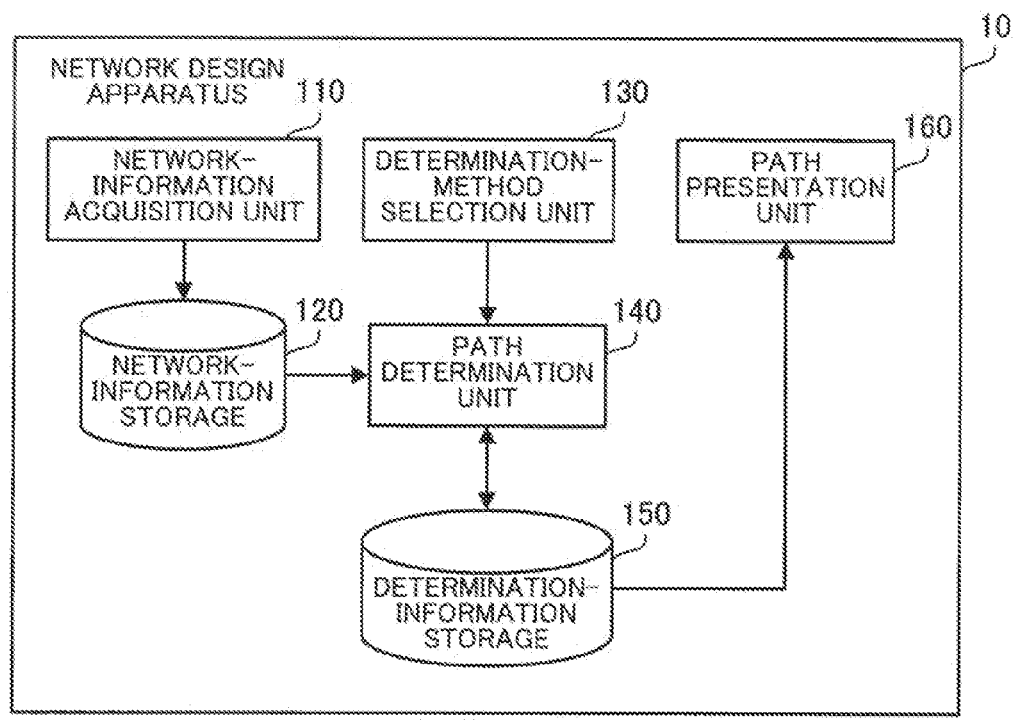

FIG. 5 indicates the functions of the network design apparatus according to the first embodiment. The network design apparatus 10 comprises as modules a network-information acquisition unit 110, a network-information storage 120, a determination-method selection unit 130, a path determination unit 140, a determination-information storage 150, and a path presentation unit 160. When the network design apparatus 10 executes the network design program, the above modules are realized in the network design apparatus 10.

The network-information acquisition unit 110 acquires information (network information) indicating the topology and transmission characteristics of the optical network 20. For example, the network-information acquisition unit 110 prompts the user to input network information, and acquires the network information which is inputted by the user (or stored in a place designated by the user). Then, the network-information acquisition unit 110 stores the acquired network information in the network-information storage 120.

The network-information storage 120 stores the network information. For example, the network-information storage 120 is a storage area in the RAM 12 or the HDD 13 which is allocated by the CPU 11. The network information can be read out by the path determination unit 140.

The determination-method selection unit 130 selects one or more path determination methods for use, from among a plurality of path determination methods. The determination-method selection unit 130 may allow the user to designate one or more path determination methods for use before processing for path determination is started. Alternatively, one or more path determination methods for use may be preset in the determination-method selection unit 130. Thereafter, the determination-method selection unit 130 informs the path determination unit 140 of the one or more path determination methods selected as above. The start node and the destination node may be designated in the network information stored in the network-information storage 120, or may be designated by the user before the processing for path determination is started.

The path determination unit 140 acquires the network information from the network-information storage 120, and determines an optimal path extending from the start node to the destination node by using the one or more path determination methods for use, of which the path determination unit 140 is informed by the determination-method selection unit 130. In the case where the path determination unit 140 is informed of a plurality of path determination methods, the path determination unit 140 executes the plurality of path determination methods in succession or in parallel, and determines an optimal path for each of the plurality of path determination methods. In this case, the path determination unit 140 may select a path which is optimum as a whole, from among the optimal paths respectively obtained by the plurality of path determination methods in accordance with a predetermined evaluation standard (e.g., on the basis of the OSNR (optical signal noise ratio)). Then, the path determination unit 140 stores the result of the determination in the determination-information storage 150. In addition to the result of the determination, the path determination unit 140 may store in the determination-information storage 150 intermediate information which is generated during the processing.

The determination-information storage 150 stores the result of the determination made by the path determination unit 140 and the intermediate information generated during the processing for path determination performed by the path determination unit 140. For example, the determination-information storage 150 is a storage area in the RAM 12 or the HDD 13 which is allocated by the CPU 11. The intermediate information can be read out by the path determination unit 140, and the result of the determination can be read out by the path presentation unit 160.

The path presentation unit 160 acquires the result of the determination from the determination-information storage 150, and presents the optimal path to the user. For example, the path presentation unit 160 displays the optimal path on the display 14a. In the case where the path determination unit 140 executes the plurality of path determination methods, the path presentation unit 160 may present either the optimal path for each of the plurality of path determination methods or the path which is optimum as a whole.

Thus, the user can be informed of a path (or a candidate for the optimal path) which is optimal from the viewpoint of dispersion. When the optimal path is determined, for example, the user issues to each node a command for path setting.

2.5 Topology of Optical Network

Figure 6:
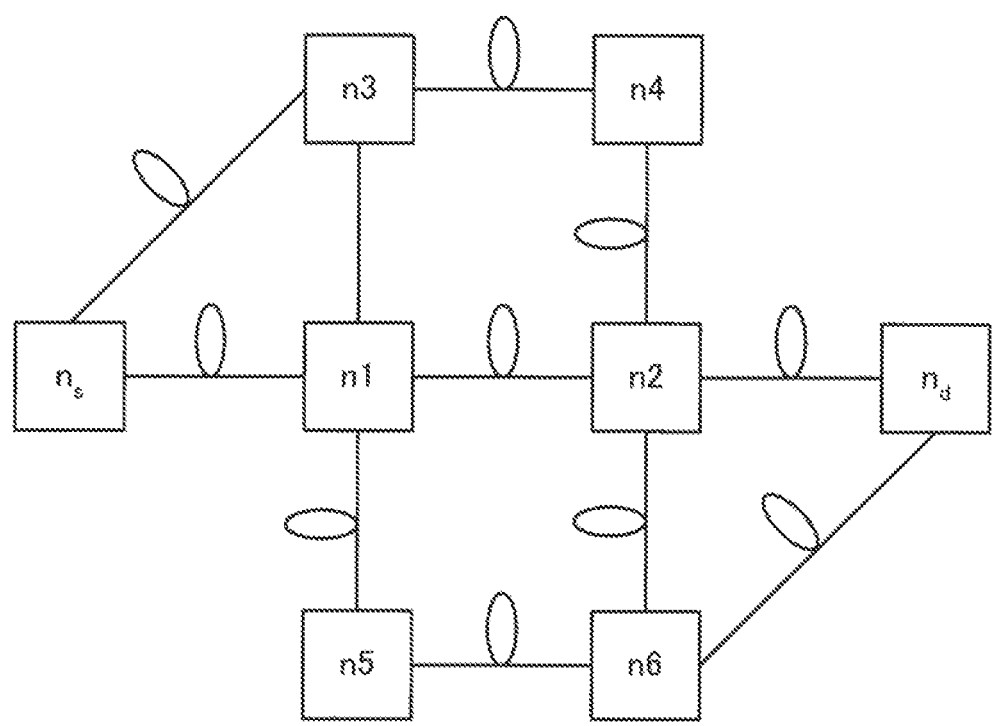
FIG. 6 indicates an example of a topology of an optical network.

In order to explain the methods for determining a path extending from the start node to the destination node according to the second embodiment, the topology of the optical network as illustrated in FIG. 6 is taken as an example. In the example of FIG. 6, the start node and the destination node are respectively denoted by $n_s$ and $n_d$.

The optical network 20 contains the nodes $n_s$, $n_d$, and n1 to n6. The node $n_s$ is adjacent to the nodes n1 and n3, the node n1 is adjacent to the nodes $n_s$, n2, n3, and n5, the node n2 is adjacent to the nodes n1, n4, n6, and $n_d$, the node n3 is adjacent to the nodes $n_s$, n1, and n4, the node n4 is adjacent to the nodes n2 and n3, the node n5 is adjacent to the nodes n1 and n6, the node n6 is adjacent to the nodes n2, n5, and $n_d$, and the node $n_d$ is adjacent to the nodes n2 and n6.

Although only one link is indicated between each pair of nodes in FIG. 6, actually two links, an uplink and a downlink, are set between each pair of nodes. However, the transmission characteristics of the two links between each pair of nodes are not necessarily identical. That is, the uplink and the downlink between each pair of nodes may have different link distances or different amounts of dispersion.

2.6 Network Information

FIG. 7 indicates an example of a structure of a network information table 121. In the network information table 121, the transmission characteristics of each span are recorded. (The span is a section of a path of an optical signal, and is the link in the second embodiment.) The network information table 121 is stored in the network-information storage 120, and contains the columns of "Input Point," "Output Point," "Distance," "Dispersion," and "Compensation."

In the column "Input Point," identification information identifying a node at the input end of each span (i.e., the input end of the optical signal) is set. In the column "Output Point," identification information identifying a node at the output end of each span (i.e., the output end of the optical signal) is set. In the column "Distance," the transmission distance of each span is set (in kilometers). In the column "Dispersion," the amount of dispersion as a transmission characteristic of the optical fiber per se is set (in picoseconds per nanometer). In the case where two or more optical fibers are connected in series, the sum of the amounts of dispersion of the two or more optical fibers is set in the column "Dispersion." In the column "Compensation," the amount of compensation made by the dispersion compensation module which is arranged in the node on the output side is set (in picoseconds per nanometer). The amount of compensation which reduces the accumulated dispersion is indicated as a negative amount of compensation.

For example, a set of information items of "Input Point=$n_s$", "Output Point=n1", "Distance=20 km", "Dispersion=340 ps/nm", and "Compensation=−290 ps/nm" are recorded in the network information table 121. The above set of information items indicates that when an optical signal transmitted from the start node propagates through an optical fiber of 20 km and reaches the node n1, the accumulated dispersion substantially is increased by 50 ps/nm (=340 ps/nm−290 ps/nm).

Further, even in the case where the dispersion compensation is made at the input end of a span or at both of the input end and the output end of a span, the amount of compensation can be recorded in a similar manner to the network information table 121. Instead of separately indicating the amount of dispersion (as a transmission characteristic of the optical fiber per se) and the amount of compensation, the substantial increment in the accumulated dispersion caused in each span (i.e., the amount of dispersion which is incremented or accumulated in each span) may be recorded in the network information table 121. Although, in FIG. 7, the network information for only one of the uplink and the downlink is indicated for each span between nodes, it is assumed that information for the other of the uplink and the downlink is also recorded in the network information table 121.

Hereinbelow, the first to tenth path determination methods as examples of the path determination methods executed by the path determination unit 140 are explained by reference to the topology illustrated in FIG. 6 and the network information indicated in FIG. 7.

2.7 First Path Determination Method

Figure 8:
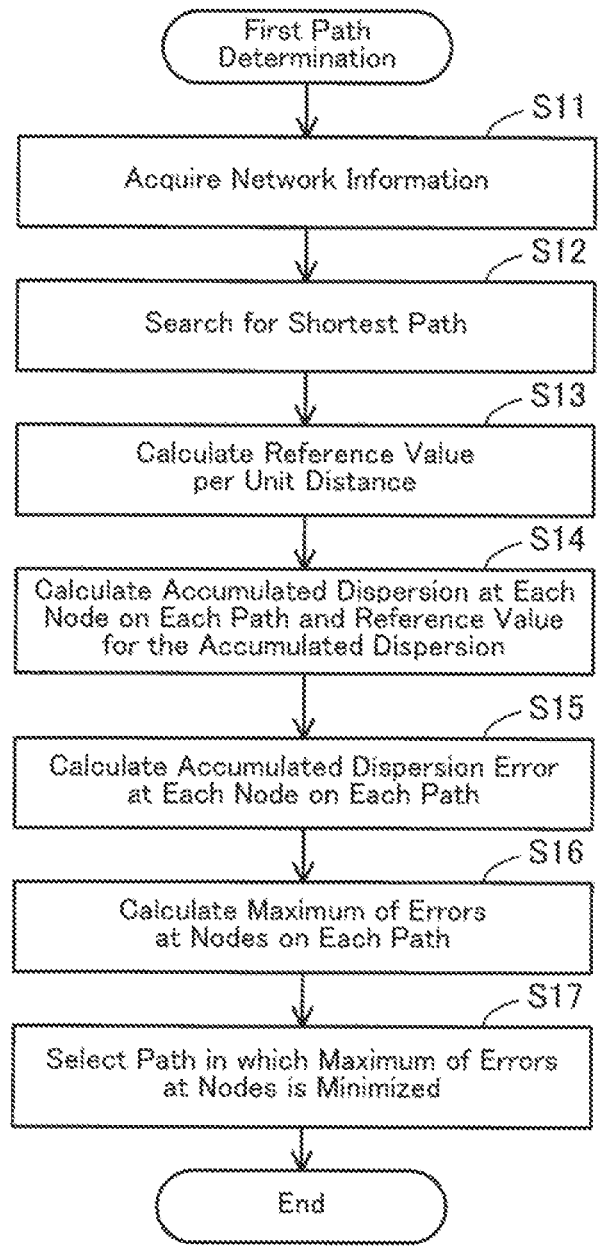
FIG. 8 is a flow diagram of a first path determination method.

FIG. 8 is a flow diagram of the first path determination method. The processing of FIG. 8 is explained below step by step.

<Step S11> The path determination unit 140 acquires the network information from the network information table 121 stored in the network-information storage 120.

<Step S12> The path determination unit 140 searches for the shortest path extending from the start node $n_s$ to the destination node $n_d$ on the basis of the connections between nodes indicated by the network information. The shortest path can be searched for by using the Dijkstra's algorithm in which the distance of each link is regarded as the cost of the link.

<Step S13> The path determination unit 140 calculates a reference value for the accumulated dispersion per unit distance on the basis of the distance of the shortest path which is searched for in step S12. The unit of the reference value is ps/nm/km. Hereinafter, the reference value for the accumulated dispersion per unit distance may be referred to as the reference value per unit distance.

Specifically, the path determination unit 140 first obtains the central value of the tolerance range of the accumulated dispersion at the destination node. The tolerance range of the accumulated dispersion is determined on the basis of the tolerable bit error rates. Then, the path determination unit 140 calculates the reference value per unit distance by dividing the central value of the tolerance range of the accumulated dispersion by the distance of the shortest path and multiplying a coefficient. The coefficient is multiplied in order to adjust the accumulated dispersion per unit distance in consideration the fact that the distances of the other paths are greater than the distance of the shortest path. The coefficient is a positive number smaller than one, and for example, 0.8.

<Step S14> The path determination unit 140 enumerates all the paths each extending from the start node to the destination node. Then, the path determination unit 140 calculates the accumulated dispersion (after compensation) at each node on each path on the basis of the values in the column "Dispersion" and the column "Compensation". In addition, the path determination unit 140 calculates a reference value for the accumulated dispersion at each node by using the reference value for the accumulated dispersion per unit distance (the reference value per unit distance) calculated in step S13, specifically, by multiplying the reference value per unit distance by the distance from the start node to each node (i.e., the sum of the distances of the links located between the start node and each node on the path).

<Step S15> The path determination unit 140 calculates an accumulated dispersion error at each node on each path. The accumulated dispersion error at each node on each path is defined as the deviation of the accumulated dispersion at each node on each path from the reference value for the accumulated dispersion at the node on the path.

<Step S16> The path determination unit 140 calculates the maximum accumulated dispersion error on each path on the basis of the accumulated dispersion error calculated in step S15. The maximum accumulated dispersion error at each nodes on each path is the maximum of the absolute values of the accumulated dispersion errors at each nodes on each path.

<Step S17> The path determination unit 140 selects as an optimal path one of the paths which has the smallest one of the maximum accumulated dispersion errors calculated in step S16. In the case where more than one path has the smallest one of the maximum accumulated dispersion errors, it is possible to select all of the more than one path as optimal paths, or select the shortest one of the more than one path as the optimal path.

As explained above, the path determination unit 140 determines the reference value (for the accumulated dispersion) per unit distance on the basis of the distance of the shortest path extending from the start node to the destination node. Then, the path determination unit 140 calculates the accumulated dispersion error at each node on each path (the error of the accumulated dispersion at each node on each path with respect to the reference value for the accumulated dispersion at each node), and determines one of the paths in which the accumulated dispersion error is minimized, to be the optimal path.

The operation in each of steps S14 and S15 may be performed for all the paths enumerated in step S14 before processing is forwarded to the next step, or the operations in all of steps S14, S15, and S16 may be performed in succession for each of the paths enumerated in step S14.

Figure 9:
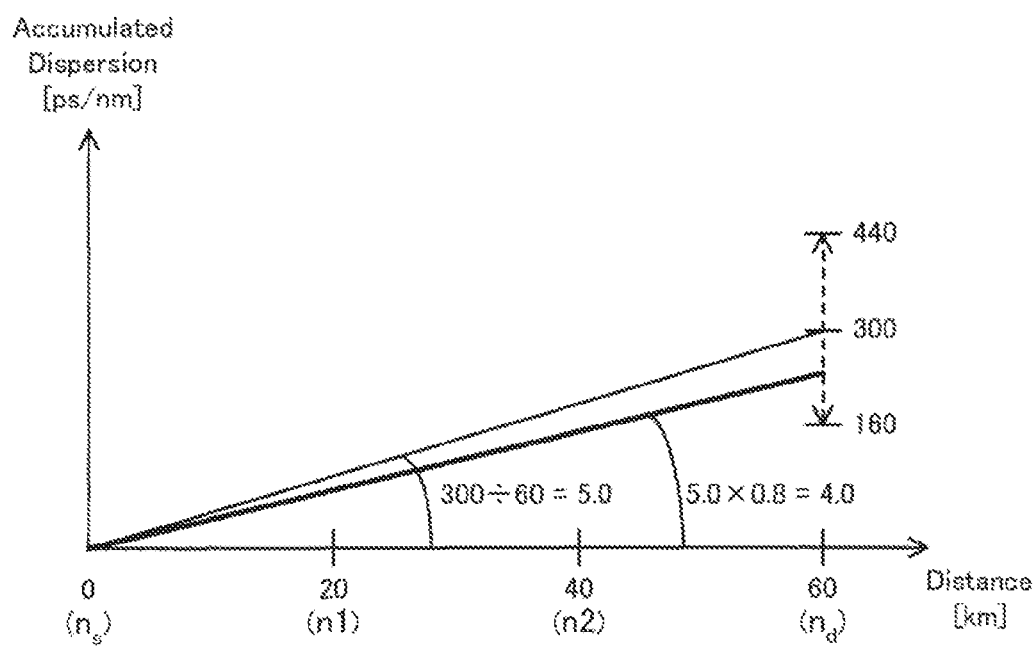
FIG. 9 indicates an example of calculation of a reference value per unit distance.

FIG. 9 indicates an example of calculation of the reference value per unit distance. In the example of FIG. 9, it is assumed that the tolerance range of the accumulated dispersion at the destination node is from 160 to 440 ps/nm, and the aforementioned coefficient is 0.8. In the topology indicated in FIGS. 6 and 7, the shortest path starts from the start node $n_s$ and passes through the nodes n1 and n2 in this order before reaching the node $n_d$. Therefore, the distance of the shortest path is 20+20+20=60 km. Then, in step S13, the central value of the tolerance range of the accumulated dispersion is obtained as (160+440)÷2=300 ps/nm, and the reference value for the accumulated dispersion is obtained as 300 ps/nm÷60 km×0.8=4.0 ps/nm/km. Subsequently, the accumulated dispersion error at each node is calculated on the basis of the reference value for the accumulated dispersion.

Figure 10:
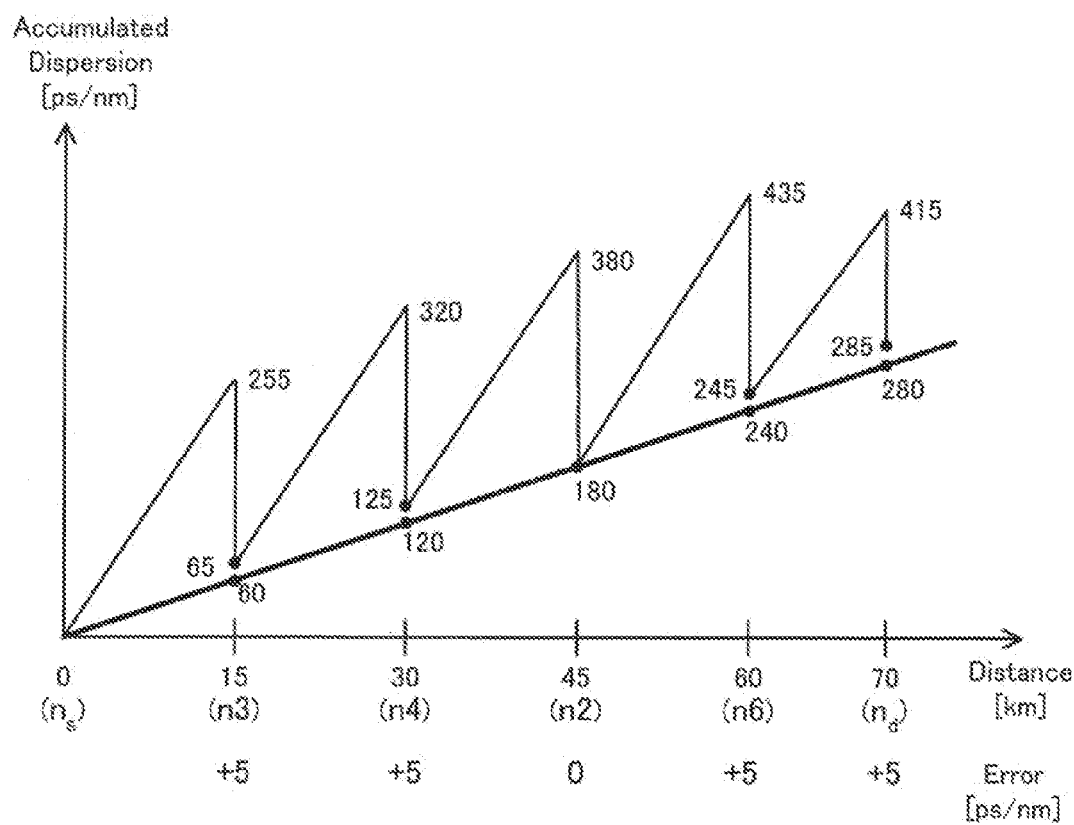
FIG. 10 indicates an example of calculation of an accumulated dispersion error.

FIG. 10 indicates examples of calculation of accumulated dispersion errors. In FIG. 10, the accumulated dispersion in the path starting from the start node $n_s$, passing through the nodes n3, n4, n2, and n6, and reaching the node $n_d$ in the topology indicated in FIGS. 6 and 7 and the corresponding reference value for the accumulated dispersion are indicated. In the example of FIG. 10, it is assumed that the reference value per unit distance is 4 ps/nm/km.

As indicated in FIG. 7, the increment in the accumulated dispersion in the optical fiber between the nodes $n_s$ and n3 is 255 ps/nm, and the amount of compensation at the node n3 is −190 ps/nm, so that the accumulated dispersion at the node n3 is calculated as 255−190=65 ps/nm. In addition, as indicated in FIG. 7, the distance of the span between the nodes $n_s$ and n3 is 15 km, so that the reference value for the accumulated dispersion at the node n3 is calculated as 15 km×4 ps/nm/km=60 ps/nm. Therefore, the accumulated dispersion error at the node n3 is calculated as 65−60=+5 ps/nm.

As indicated in FIG. 7, the increment in the accumulated dispersion in the optical fiber between the nodes n3 and n4 is 255 ps/nm, and the amount of compensation at the node n4 is −195 ps/nm, so that the accumulated dispersion at the node n4 is calculated as 65+255−195=125 ps/nm. In addition, as indicated in FIG. 7, the distance of the span between the nodes n3 and n4 is 15 km, so that the reference value for the accumulated dispersion at the node n4 is calculated as (15+15) km×4 ps/nm/km=120 ps/nm. Therefore, the accumulated dispersion error at the node n4 is calculated as 125−120=+5 ps/nm. Similarly, the accumulated dispersion errors at the nodes n2, n6, and $n_d$ are respectively calculated as 0 ps/nm, +5 ps/nm, and +5 ps/nm.

After the above calculations are performed in steps S14 and S15, the maximum accumulated dispersion error on the path is calculated as 5 ps/nm.

FIG. 11 indicates an example of a structure of a path error table 151. The path determination unit 140 produces the path error table 151 during execution of the first path determination method, and stores the path error table 151 in the determination-information storage 150. As indicated in FIG. 11, there are twelve paths each extending from the start node $n_s$ to the destination node $n_d$ in the optical network having the topology indicated in FIGS. 6 and 7 under the condition that each path passes through neither an identical node nor an identical span twice. This condition is imposed for avoiding occurrence of a loop.

In the path error table 151, identification information for each node on each of the paths enumerated in step S14 is recorded in the order in which the path passes through the node. In addition, the absolute value of the accumulated dispersion error at each node on each path is recorded in correspondence with the identification information for the node. For example, the information items of "n1=30", "n2=70", and "$n_d$=90" are recorded for the shortest path (the path #1), so that the maximum accumulated dispersion error on the path #1 is 90 ps/nm. In addition, the information items of "n3=5", "n4=5", "n2=0", "n6=5", and "$n_d$=5" are recorded for the path (the path #12), so that the maximum accumulated dispersion error on the path #12 is 5 ps/nm.

As explained above, the maximum accumulated dispersion error on each path extending from the start node to the destination node can be calculated by producing the path error table 151. In the example of the topology illustrated in FIGS. 6 and 7, the path #12 has the smallest one of the maximum accumulated dispersion errors. Therefore, according to the first path determination method, the path #12 (which starts from the start node $n_s$ and passes through the nodes n3, n4, n2, and n6 in this order before reaching the node $n_d$) is selected as the optimal path. The accumulated dispersion at the destination node after the optical signal passes through the path #12 is 285 ps/nm, and falls within the tolerance range of 160 to 440 ps/nm.

In the case where the accumulated dispersion at the destination node after the optical signal passes through a path is out of the tolerance range, it is undesirable to transmit the optical signal through the path. In this case, it is possible to consider a countermeasure such as selection of another path having the smallest maximum accumulated dispersion error from among the paths other than the path in which the accumulated dispersion at the destination node is out of the tolerance range, or provision of a regenerative repeater in the path in which the accumulated dispersion at the destination node is out of the tolerance range. The regenerative repeater is a signal converter which first converts an optical signal into an electric signal, and thereafter converts the electric signal into an optical signal. Further, in the case where another transmission characteristic such as OSNR (optical signal-to-noise ratio) does not reach a predetermined level, it is also preferable to consider a countermeasure such as the selection of another path or the provision of a regenerative repeater. The regenerative repeater is a signal converter which once converts an optical signal into an electric signal, and thereafter converts the electric signal into an optical signal. However, since the regenerative repeater is a device which processes the wavelength division multiplexed optical signal on a wavelength-by-wavelength basis, and increases the cost of the optical network 20, it is preferable not to use the regenerative repeater.

As explained above, according to the first path determination method, it is possible to select, from among a plurality of paths each extending from the start node to the destination node, a path in which the accumulated dispersion at each node after dispersion compensation linearly and slowly increases (or decreases). That is, the optimal path is determined in consideration of the variations in the accumulated dispersion along each path as well as the accumulated dispersion at the destination node. Therefore, it is possible to suppress the nonlinear distortion which can occur in each path, and improve the quality of transmission of the optical signal.

2.8 Second Path Determination Method

According to the first path determination method, all the paths each extending from the start node to the destination node are enumerated, and the optimal path is selected from among the paths. On the other hand, according to the second path determination method, an optimal path is searched for without enumerating all the paths.

According to the second path determination method, the mixed-integer programming is used for path search. The mixed-integer programming is a technique for solving an optimization problem (mixed-integer programming problem) in which integer variables and real-number variables are mixed. In the mixed-integer programming, a mixed-integer programming problem constituted by variables which can take on an integer value or a real number, an objective function, and constraints is given, and the values of the variables which can optimize (maximize or minimize) the value of the objective function under the constraints. For example, a technique which can be used for solving the mixed-integer programming problem is disclosed in Masatoshi Sakawa, "Risan Shisutemu no Saitekika (Optimization of Discrete System)," published in Japanese by Morikita Publishing Co., Ltd., Japan, May 2000.

Figure 12:
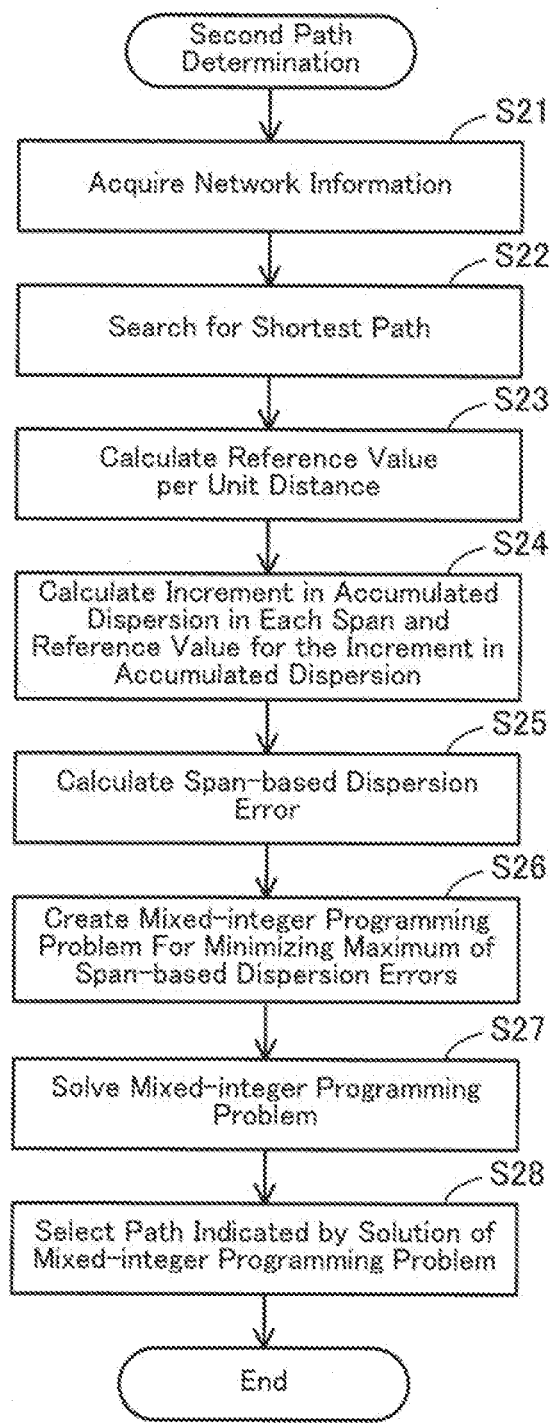
FIG. 12 is a flow diagram of a second path determination method.

FIG. 12 is a flow diagram of the second path determination method. The processing of FIG. 12 is explained below step by step.

<Step S21> The path determination unit 140 acquires the network information from the network information table 121 stored in the network-information storage 120.

<Step S22> The path determination unit 140 searches for the shortest path extending from the start node $n_s$ to the destination node $n_d$ on the basis of the connections between nodes indicated by the network information.

<Step S23> The path determination unit 140 calculates the reference value per unit distance (i.e., the reference value for the accumulated dispersion per unit distance) on the basis of the distance of the shortest path which is searched for in step S22.

<Step S24> The path determination unit 140 calculates the amount of dispersion caused in each span (i.e., the increment in the accumulated dispersion caused in each span, or the amount of dispersion which is incremented or accumulated in each span) on the basis of the values in the column "Dispersion" and the values in the column "Compensation". In addition, the path determination unit 140 calculates a reference value for the amount of dispersion caused in each span by using the reference value per unit distance calculated in step S23, specifically, by multiplying the reference value per unit distance by the distance of each span.

<Step S25> The path determination unit 140 calculates the error of the increment in the accumulated dispersion in each span on the basis of the amount of dispersion caused in each span and the reference value for the amount of dispersion caused in the span, specifically, by obtaining the deviation of the increment in the accumulated dispersion in each span from the reference value for the increment in the accumulated dispersion in the span. Hereinafter, the error of the increment in the accumulated dispersion in each span may be referred to as the span dispersion error.

<Step S26> The path determination unit 140 creates a mixed-integer programming problem on the basis of the span dispersion error in each span calculated in step S25. The objective function in the mixed-integer programming problem corresponds to the maximum accumulated dispersion error, and the mixed-integer programming problem is to reduce the maximum accumulated dispersion error. At this time, it is possible to include a distance component in the objective function in order to select a shorter path when more than one path is equivalent in the maximum accumulated dispersion error. Details of the mixed-integer programming problem are explained later.

<Step S27> The path determination unit 140 solves the mixed-integer programming problem created in step S26. Thus, a path in which the objective function is optimized is searched for. That is, a path in which the maximum accumulated dispersion error is minimized is searched for. (In the case where the objective function contains the distance component, a path in which the maximum accumulated dispersion error and the distance are smaller is searched for.)

<Step S28> The path determination unit 140 selects as the optimal path the path searched for in step S27.

In the above procedure of FIG. 12, the operation in step S24 may be performed for all the paths before processing is forwarded to the next step, or the operations in both of steps S24 and S25 may be performed in succession for each path.

As explained above, according to the second path determination method, the path determination unit 140 determines the reference value per unit distance on the basis of the distance of the shortest path extending from the start node to the destination node. Then, the path determination unit 140 calculates the maximum accumulated dispersion error (i.e., the error of the amount of dispersion or the error of the increment in the accumulated dispersion) in each span with respect to the corresponding reference value is calculated, and searches for a path in which the maximum accumulated dispersion error is minimized, by mixed-integer programming.

Although the error of the increment in the accumulated dispersion in each span is calculated according to the second path determination method, a similar procedure can also be used in the first path determination method. That is, the first path determination method can be modified so as to calculate the span dispersion error (i.e., the error of the increment in the accumulated dispersion) in each span, and obtain the accumulated dispersion error at each node by accumulating the span dispersion errors in the spans on each path from the start node to the destination node. It is advantageous to modify the first path determination method as above because parts of the procedures in the first and second path determination methods can be executed in common in the case where both of the first and second path determination methods are executed.

FIG. 13 indicates an example of a structure of a span error table 152. The path determination unit 140 produces the span error table 152 during execution of the second path determination method, and stores the span error table 152 in the determination-information storage 150. In the example of FIG. 13, the reference value per unit distance is assumed to be 4 ps/nm/km.

For example, the span dispersion error (i.e., the error of the increment in the accumulated dispersion) in the span can be calculated on the basis of the information indicated in the network information table 121 in FIG. 7, for example, as indicated below. In the span between the nodes $n_s$ and n1, the increment in the amount of dispersion is 340−290=50 ps/nm, and the reference value for the increment in the accumulated dispersion in the span is 20 km×4 ps/nm/km=80 ps/nm. Therefore, the span dispersion error (i.e., the error of the increment in the accumulated dispersion) in the span is 50−80=−30 ps/nm. In the span between the nodes $n_s$ and n3, the increment in the amount of dispersion is 255−190=65 ps/nm, and the reference value for the increment in the accumulated dispersion in the span is 15 km×4 ps/nm/km=60 ps/nm. Therefore, the span dispersion error (i.e., the error of the increment in the accumulated dispersion) in the span is 65−60=+5 ps/nm. Similarly, the span dispersion errors in the other spans are respectively calculated.

Next, an example of a mixed-integer programming problem created in step S26 is indicated below.

For example, the following constants are defined.

N: The set of all nodes contained in the network
$n_s$: The start node of a path to be searched for
$n_d$: The destination node of a path to be searched for
$N_e$: The set of all the nodes other than the start node $n_s$ and the destination node $n_d$
E: The set of all spans contained in the network
$e(n_i, n_j)$: The span having the node $n_1$ as a start node and the node $n_j$ as and destination node (The span $e(n_i, n_j)$ may be referred to as the span e.)
L[e]: The distance of the span e
$d_1[e]$: The increment in the accumulated dispersion in the span e
$d_2[e]$: The error of the increment in the accumulated dispersion in the span e
upperBound: The upper limit of the tolerance range of the accumulated dispersion at the destination node
lowerBound: The lower limit of the tolerance range of the accumulated dispersion at the destination node For example, the following variables are defined.

$x[n_d, e]$: An integer variable which is one when the span e is contained in a path extending from the start node $n_s$ to the destination node $n_d$, and is otherwise zero
$x[n_e, e]$: An integer variable which is one when the span e is contained in a path extending from the start node $n_s$ to the node $n_e$ and the span e is contained in a path extending from the start node $n_s$ to the node $n_e$ ($x[n_d, e]=1$), and is otherwise zero
$d_{pos}[n]$: A variable which is the sum of the span dispersion errors (i.e., the errors of the increments in the accumulated dispersion) in the spans contained in a path extending from the start node $n_s$ to the node n when the sum is positive, and is otherwise zero
$d_{neg}[n]$: A variable which is the absolute value of the sum of the span dispersion errors in the spans contained in a path extending from the start node $n_s$ to the node n when the sum is negative, and is otherwise zero
D: The maximum of the values of $d_{pos}$ and $d_{neg}$ The objective function of the mixed-integer programming problem is defined, for example, in the expression (1).

$$\text{minimize } D + \alpha \cdot \left( \sum_e L[e] x[n_d, e] \right) \quad (1)$$

The first term of the objective function indicates the maximum accumulated dispersion error, and the second term of the objective function indicates the influence of the sum of the distances of the spans contained in a path, where α is a coefficient for adjusting the degree of influence of the sum of the distances, and is, for example, 0.1 or 0.01. That is, the objective function (1) is defined so as to search for a path which minimizes the sum of the maximum accumulated dispersion error and the value corresponding to the sum of the distances of the spans. The coefficient α can be changed according to various conditions. For example, the coefficient α can be a small value in the case where the size of the network is large. It is preferable that the influence of the maximum accumulated dispersion error in the first term be relatively great, and the influence of the sum of the distances of the spans in the second term be relatively small.

The constraints in the mixed-integer programming problem are defined, for example, as indicated in the following equations and inequalities (2) to (14).

$$\sum_{e1} x[n_d, e1] = 0, \sum_{e2} x[n_d, e2] = 1 \tag{2}$$

$$\sum_{e1} x[n_d, e1] = 1, \sum_{e2} x[n_d, e2] = 0 \tag{3}$$

$$\sum_{e1} x[n_d, e1] \le 1, \sum_{e1} x[n_d, e1] - \sum_{e2} x[n_d, e2] = 0 \tag{4}$$
$$\text{for } \forall n \in N_e$$

$$\sum_{e1} x[n_e, e1] = 0, \sum_{e2} x[n_e, e2] - \sum_{e3} x[n_d, e3] = 0 \tag{5}$$
$$\text{for } \forall n_e \in N_e$$

$$\sum_{e1} x[n_e, e1] - \sum_{e3} x[n_d, e3] = 0, \sum_{e2} x[n_e, e2] = 0 \tag{6}$$
$$\text{for } \forall n_e \in N_e$$

$$\sum_{e1} x[n_e, e1] \le 1, \sum_{e1} x[n_e, e1] - \sum_{e2} x[n_e, e2] = 0 \tag{7}$$
$$\text{for } \forall n \in N_c, \forall n_e \in N_e$$

$$x[n_d, e] - x[n_e, e] \ge 0 \text{ for } \forall e \in E, \forall n_e \in N_e \tag{8}$$

$$\sum_{e} d_1[e] x[n_d, e] - \text{lower Bound} \ge 0 \text{ for } \forall e \in E \tag{9}$$

$$\text{upper Bound} - \sum_{e} d_1[e] x[n_d, e] \ge 0 \text{ for } \forall e \in E \tag{10}$$

$$d_{pos}[n] - \sum_{e} d_2[e] x[n, e] \ge 0 \text{ for } \forall e \in E, \forall n \in N \tag{11}$$

$$d_{neg}[n] + \sum_{e} d_2[e] x[n, e] \ge 0 \text{ for } \forall e \in E, \forall n \in N \tag{12}$$

$$D - d_{pos}[n] \ge 0 \text{ for } \forall n \in N \tag{13}$$

$$D - d_{neg}[n] \ge 0 \text{ for } \forall n \in N \tag{14}$$

The equations and inequality (2) to (4) indicate constraints for continuity of the path, and the equations and inequalities (5) to (8) indicate constraints on partial paths. The partial paths are each a part of the optimal path extending from the start node to an intermediate node $n_e$. The inequalities (9) and (10) indicate constraints on the accumulated dispersion at the destination node, and the inequalities (11) to (14) indicate constraints for definition of the maximum accumulated dispersion error.

Specifically, the equations (2) indicate that no span having the start node as the output end exists in the optimal path, and only one span having the start node as the input end exists in the optimal path. In the equations (2), e1 denotes spans having the start node $n_s$ as the output end, and e2 denotes spans having the start node $n_s$ as the input end.

The equations (3) indicate that only one span having the destination node as the output end exists in the optimal path, and no span having the destination node as the input end exists in the optimal path. In the equations (3), e1 denotes spans having the destination node $n_d$ as the output end, and e2 denotes spans having the destination node $n_d$ as the input end.

The expressions (4) indicate that at most one span having the node n as the output end exists in the optimal path, and the number of spans each having the node n as the output end is equal to the number of spans each having the node n as the input end in the optimal path, where the node n is a node on the optimal path other than the start node $n_s$ and the destination node $n_d$. In the expressions (4), e1 denotes spans having the node n as the output end, and e2 denotes spans having the node n as the input end.

The equations (5) indicate that no span having the start node as the output end exists in a partial path extending from the start node to the node $n_e$, and a span having the start node as the input end exists in the partial path only when the optimal path passes through the node $n_e$, where the node $n_e$ is neither the start node $n_s$ nor the destination node $n_d$. In the equations (5), e1 denotes spans having the start node $n_s$ as the output end, e2 denotes spans having the start node $n_s$ as the input end, and e3 denotes spans having the node $n_e$ as the output end.

The equations (6) indicate that the number of spans each having the node $n_e$ as the output end and existing in a partial path extending from the start node to the node $n_e$ is equal to the number of spans each having the node $n_e$ as the output end and existing in the optimal path, and no span having the node $n_e$ as the input end exists in the partial path. In the equations (6), e1 denotes spans having the node $n_e$ as the output end, e2 denotes spans having the node $n_e$ as the input end, and e3 denotes spans having the node $n_e$ as the output end.

The equations (7) indicate that at most one span having as the output end an arbitrary node n other than the nodes $n_s$ and $n_d$, and a node $n_e$ exists in an partial path extending from the start node to the node $n_e$, and the number of spans each having the node n as the output end is equal to the number of spans each having the node n as the input end in the partial path. In the equations (7), e1 denotes spans having the node n as the output end, e2 denotes spans having the node n as the input end, and $N_e$ indicates a set of nodes other than the nodes $n_s$, $n_d$, and $n_e$.

The inequality (8) indicates, for an arbitrary span e, that there is no partial path containing the span e when the span e is not contained in the optimal path.

The inequalities (9) and (10) indicate the definition of the tolerance range of the accumulated dispersion at the destination node. The inequality (11) indicates the definition of the variable $d_{pos}$, and the inequality (12) indicates the definition of the variable $d_{neg}$. The inequality (13) indicates the definition of the variable D when the maximum accumulated dispersion error is positive, and the inequality (14) indicates the definition of the variable D when the maximum accumulated dispersion error is negative.

When the mixed-integer programming problem defined as above is solved, the values of the integer variable $x[n_d, e]$ for all the spans e are determined. The optimal path can be determined by connecting the spans satisfying $x[n_d, e] = 1$. The path search according to the second embodiment is a search problem in which the principle of optimality does not exist. (In other words, the local optimality does not lead to the global optimality.) Therefore, the optimal path cannot be searched for in a heuristic manner. However, the optimal path can be searched for by defining the objective function and the constraints as explained above and solving the mixed-integer programming problem.

As explained above, according to the second path determination method, similarly to the first path determination method, it is possible to select a path in which the accumulated dispersion after dispersion compensation linearly and slowly increases (or decreases). In addition, it is possible to search for an optimal path without enumerating all the paths.

2.9 Third Path Determination Method

According to the first path determination method, the maximum accumulated dispersion errors in each path is calculated, and the optimal path is selected by comparison between the maximum accumulated dispersion errors in the paths. On the other hand, according to the third path determination method, an optimal path is selected by calculating the sum of the absolute values of the errors of the accumulated dispersion at nodes on each path, and the optimal path is selected by comparison between the sums of the absolute values of the errors of the accumulated dispersion at the nodes on the paths. Hereinafter, the sum of the absolute values of the errors of the accumulated dispersion at nodes on each path may be referred to as a dispersion error sum.

Figure 14:
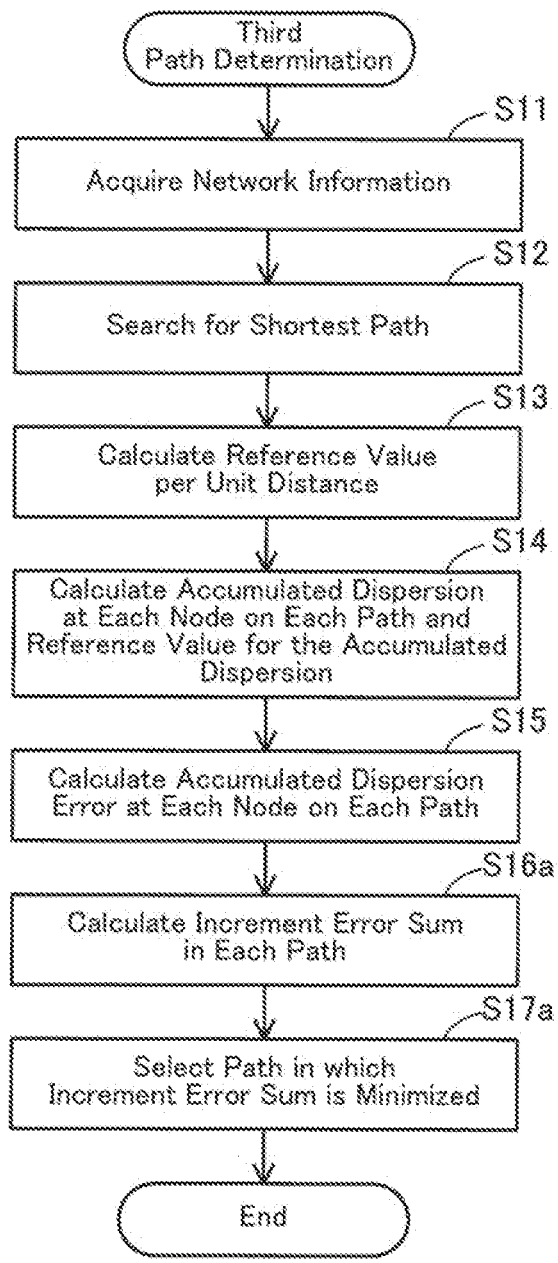
FIG. 14 is a flow diagram of a third path determination method.

FIG. 14 is a flow diagram of the third path determination method. The third path determination method is different from the first path determination method in that steps S16a and S17a indicated in FIG. 14, instead of steps S16 and S17 indicated in FIG. 8 for the first path determination method, are executed.

<Step S16a> The path determination unit 140 calculates the dispersion error sum in each path on the basis of the accumulated dispersion errors calculated in step S15.

<Step S17a> The path determination unit 140 selects as the optimal path a path in which the dispersion error sum calculated in step S16a is minimized. In the case where more than one path has the smallest one of the dispersion error sums, it is possible to select all of the more than one path as optimal paths, or select the shortest one of the more than one path as the optimal path.

As explained above, according to the third path determination method, similarly to the first path determination method, it is possible to select a path in which the accumulated dispersion after dispersion compensation linearly and slowly increases (or decreases). In addition, since the dispersion error sum is used as the index for evaluating the paths, it is possible to select as the optimal path a path in which the increasing characteristic of the accumulated dispersion is close to an ideal linear increase as a whole.

2.10 Fourth Path Determination Method

According to the second path determination method, a path in which the maximum accumulated dispersion error is minimized is searched for by using mixed-integer programming. On the other hand, according to the fourth path determination method, a path in which the dispersion error sum is reduced is searched for by using mixed-integer programming.

Figure 15:
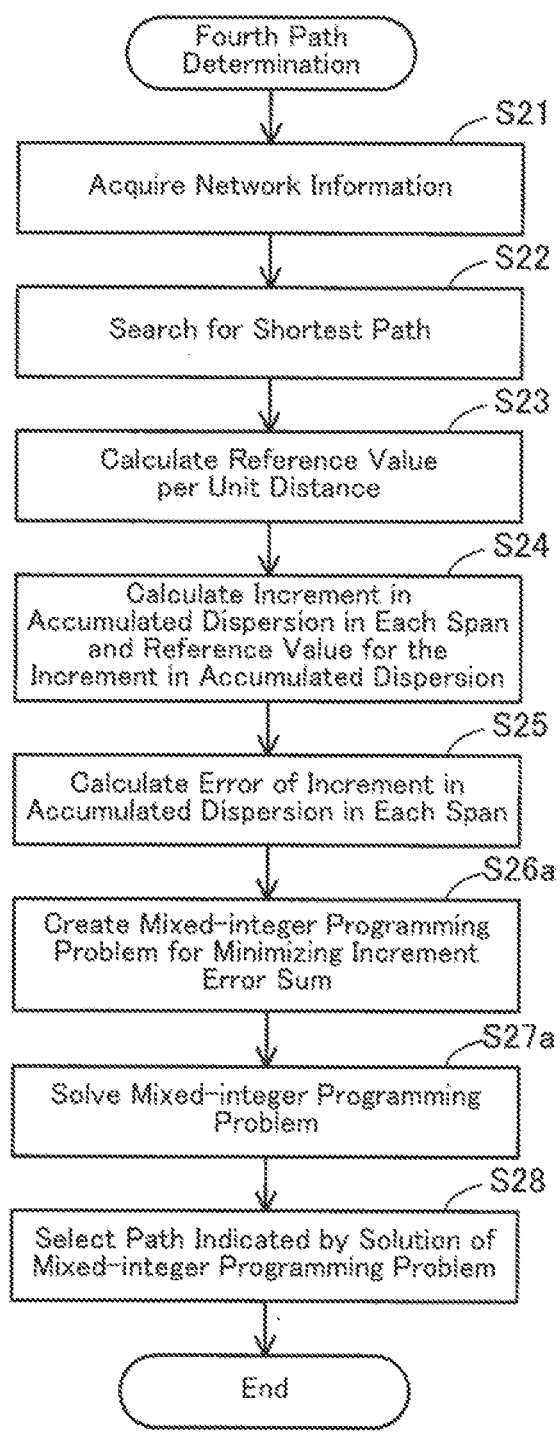
FIG. 15 is a flow diagram of a fourth path determination method.

FIG. 15 is a flow diagram of the fourth path determination method. The fourth path determination method is different from the second path determination method in that steps S26a and S27a indicated in FIG. 15, instead of steps S26 and S27 indicated in FIG. 12 for the second path determination method, are executed.

<Step S26a> The path determination unit 140 creates a mixed-integer programming problem on the basis of the span dispersion errors calculated in step S25 for each path. The mixed-integer programming problem is to reduce the dispersion error sum in the path, which is indicated by an objective function. (As mentioned before, the dispersion error sum is the sum of the absolute values of the errors of the increments in the accumulated dispersion at a plurality of nodes on each path.) At this time, it is possible to include a distance component in the objective function in order to select a shorter path when more than one path is equivalent in the dispersion error sum.

<Step S27a> The path determination unit 140 solves the mixed-integer programming problem created in step S26a, so that a path in which the objective function is optimized, i.e., a path in which the dispersion error sum is minimized, is searched for. (In the case where the objective function contains a distance component, a path having a small dispersion error sum and a small distance is searched for.)

The objective function in the mixed-integer programming problem created in step S26a is defined, for example, as in the expression (15).

$$\text{minimize} \sum_n (d_{pos}[n] + d_{neg}[n]) + \alpha \cdot \left( \sum_e L[e]x[n_d, e] \right) \quad (15)$$

The first term of the objective function indicates the dispersion error sum, and the second term of the objective function indicates the influence of the sum of the distances of the spans contained in each path. As in the second path determination method, α is a coefficient for adjusting the degree of influence of the sum of the distances. That is, the objective function (1) is defined so as to search for a path which minimizes the sum of the dispersion error sum and the value corresponding to the sum of the distances of the spans. The coefficient α can be changed according to various conditions, For example, the coefficient α can be a small value in the case where the size of the network is large. It is preferable that the influence of the dispersion error sum in the first term be relatively great, and the influence of the sum of the distances of the spans in the second term be relatively small.

The constraints indicated as examples in the expressions (2) to (12) for the second path determination method can also be used in the fourth path determination method. Since the expressions (13) and (14) in the second path determination method indicate the constraints defining the maximum accumulated dispersion error, the expressions (13) and (14) are unnecessary in the fourth path determination method.

As explained above, according to the fourth path determination method, similarly to the third path determination method, it is possible to select a path in which the accumulated dispersion after dispersion compensation linearly and slowly increases (or decreases) without enumerating all the paths. In addition, since the dispersion error sum is used as the index for evaluating the paths, it is possible to select as the optimal path a path in which the increasing characteristic of the accumulated dispersion is close to an ideal linear increase as a whole.

2.11 Fifth Path Determination Method

According to the first path determination method, the reference value for the accumulated dispersion per unit distance (the reference value per unit distance) is calculated by use of the distance of the shortest path. On the other hand, according to the fifth path determination method, the reference value per unit distance is calculated by use of the distance of a path other than the shortest path.

Figure 16:
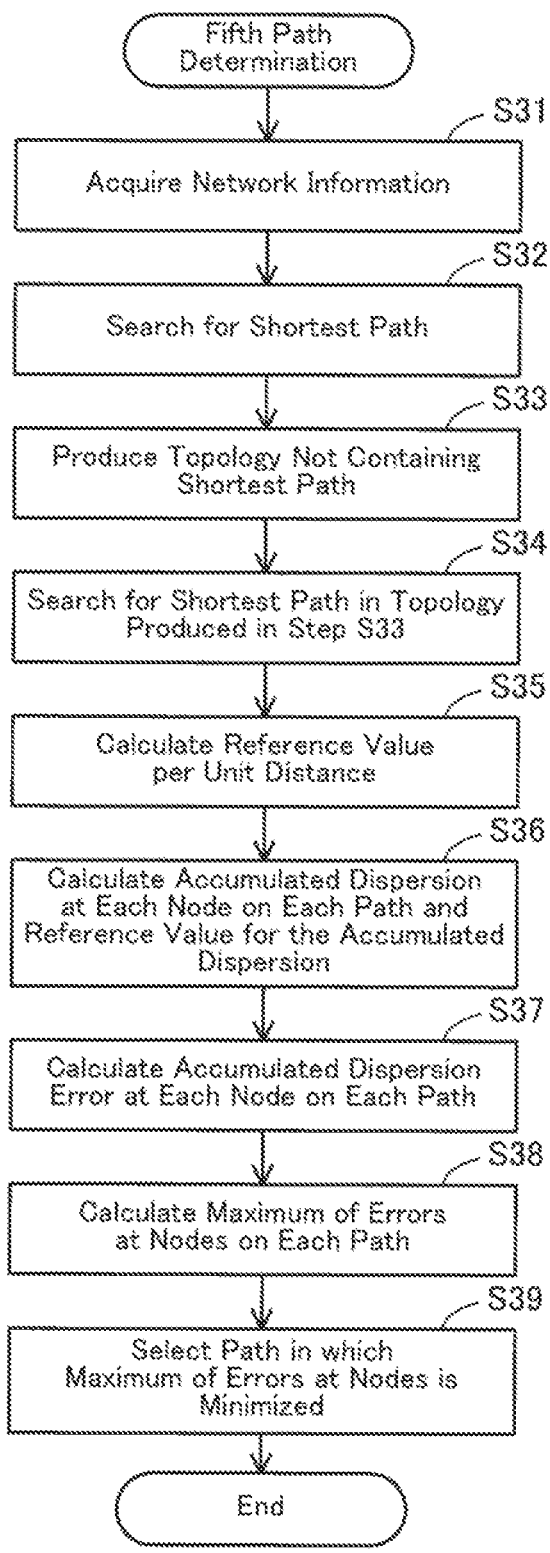
FIG. 16 is a flow diagram of a fifth path determination method.

FIG. 16 is a flow diagram of the fifth path determination method. The processing of FIG. 16 is explained below step by step.

<Step S31> The path determination unit 140 acquires the network information from the network information table 121 stored in the network-information storage 120.

<Step S32> The path determination unit 140 searches for a shortest path extending from the start node $n_s$ to the destination node $n_d$ on the basis of the connections between nodes indicated by the network information.

<Step S33> The path determination unit 140 manipulates the network information. Specifically, the path determination unit 140 removes the spans contained in the shortest path searched for in step S32, from the set of spans actually contained in the network, so as to produce a topology not containing the shortest path.

<Step S34> The path determination unit 140 searches for the shortest path extending from the start node $n_s$ to the destination node $n_d$ in the topology produced in step S33, on the basis of the connections between nodes indicated by the network information.

<Step S35> The path determination unit 140 calculates a reference value for the amount of dispersion accumulated in each span (the reference value per unit distance) on the basis of the distance of the path searched for in step S34. The reference value per unit distance is defined, for example, by division of the central value of the tolerance range of the accumulated dispersion at the destination node by the distance of the path searched for in step S34. In the fifth path determination method, the coefficient as mentioned in step S13 in the first path determination method for adjusting the accumulated dispersion per unit distance is unnecessary.

<Step S36> The path determination unit 140 enumerates all the paths each extending from the start node to the destination node in the topology in which the shortest path is not removed. Then, the path determination unit 140 calculates the accumulated dispersion (after compensation) at each node on each path. In addition, the path determination unit 140 calculates a reference value for the accumulated dispersion at each node by using the reference value per unit distance calculated in step S35.

<Step S37> The path determination unit 140 calculates the accumulated dispersion error at each node on each path. The accumulated dispersion error is the deviation of the accumulated dispersion from the reference value for the accumulated dispersion.

<Step S38> The path determination unit 140 calculates the maximum accumulated dispersion errors in each path on the basis of the errors of the accumulated dispersion calculated in step S37. The maximum accumulated dispersion error in each path is the maximum of the absolute values of the errors of (differences in) the accumulated dispersion at the nodes on each path.

<Step S39> The path determination unit 140 selects as an optimal path one of the paths which has the smallest one of the maximum accumulated dispersion errors calculated in step S38. In the case where more than one path has the smallest one of the maximum accumulated dispersion errors, it is possible to select all of the more than one path as optimal paths, or select the shortest one of the more than one path as the optimal path.

Figure 17:
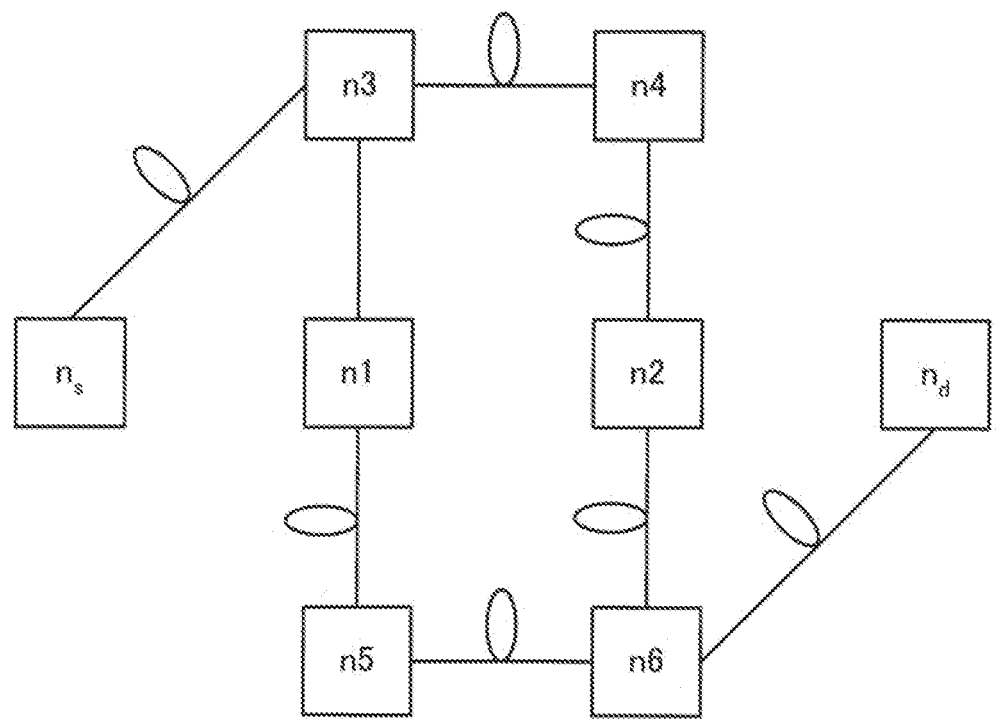
FIG. 17 indicates an example of a topology in which the shortest path is removed.

FIG. 17 indicates an example of a topology in which the shortest path is removed. In the case where the original network has the topology illustrated in FIGS. 6 and 7, the shortest path is the path which starts from the start node $n_s$, passes through the nodes n1 and n2 in this order, and reaches the destination node $n_d$. Therefore, the span between the nodes $n_s$ and n1, the span between the nodes n1 and n2, and the span between the nodes n2 and $n_d$ are removed from the original topology. Then, the shortest path in the topology after the removal is searches for, so that a path which starts from the start node $n_s$, passes through the nodes n3, n4, n2, and n6 in this order, and reaches the destination node $n_d$ is obtained as the shortest path in the topology after the removal. Thus, the path determination unit 140 calculates the reference value per unit distance on the basis of the distance of the shortest path in the topology after the removal.

As explained above, according to the fifth path determination method, similarly to the first path determination method, it is possible to select a path in which the accumulated dispersion after dispersion compensation linearly and slowly increases (or decreases). In addition, since the reference value per unit distance is calculated on the basis of the distance of a path other than the shortest path in the original network topology (which is the distance longer than the shortest path), it is possible to set the reference value per unit distance at an appropriate level, without multiplying any coefficient for adjustment, and therefore efficiently suppress the possibility that the accumulated dispersion in the selected path exceeds the upper limit of the tolerance range.

Further, even in the fifth path determination method, it is possible to search for the optimal path by mixed-integer programming as explained in the second path determination method. Furthermore, the optimal path may be determined on the basis of the dispersion error sum in each path as explained for the third path determination method.

2.12 Sixth Path Determination Method

According to the fifth path determination method, the reference value per unit distance is calculated by use of the distance of a path other than the shortest path. On the other hand, according to the sixth path determination method, the reference value per unit distance is calculated by using both of the distance of the shortest path and the distance of a path other than the shortest path.

Figure 18:
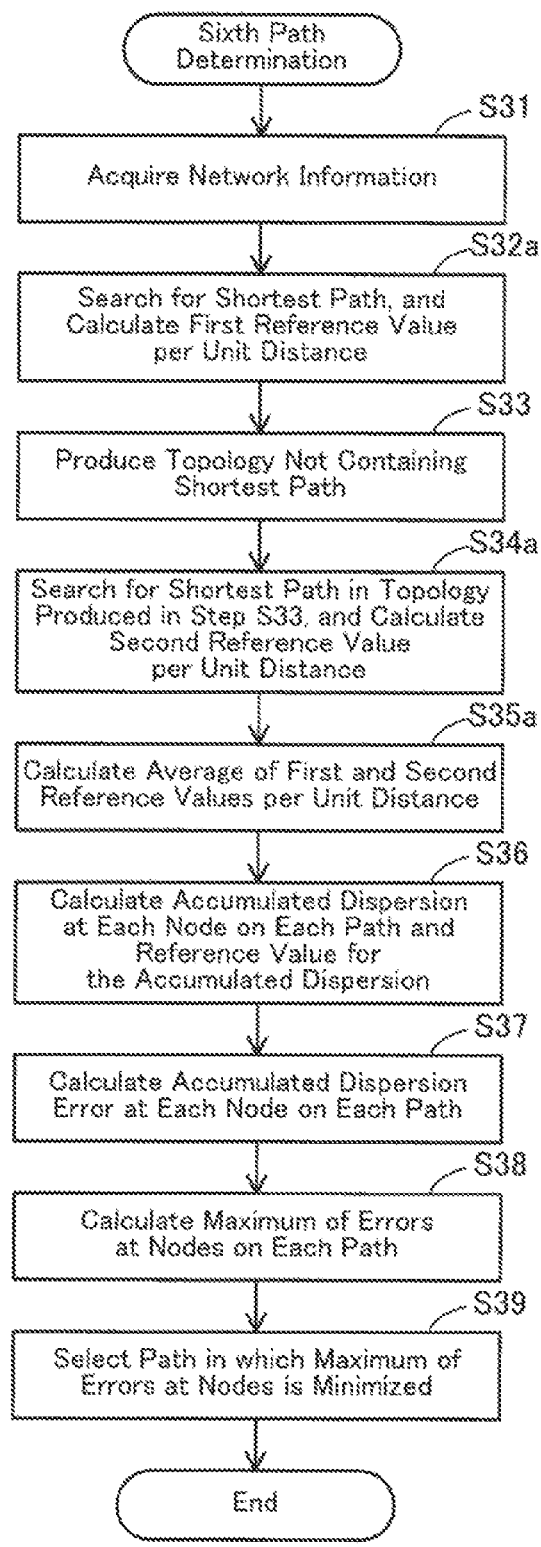
FIG. 18 is a flow diagram of a sixth path determination method.

FIG. 18 is a flow diagram of the sixth path determination method. The sixth path determination method is different from the fifth path determination method in that steps S32a, S34a, and S35a indicated in FIG. 18, instead of steps S32, S34, and S35 indicated in FIG. 16 for the fifth path determination method, are executed.

<Step S32a> The path determination unit 140 searches for the shortest path extending from the start node $n_s$ to the destination node $n_d$ on the basis of the connections between nodes indicated by the network information. Then, the path determination unit 140 calculates a first reference value per unit distance on the basis of the distance of the above shortest path, for example, by division of the central value of the tolerance range of the accumulated dispersion at the destination node by the distance of the shortest path. At this time, the coefficient as mentioned in step S13 in the first path determination method for adjusting the accumulated dispersion per unit distance is unnecessary.

<Step S34a> The path determination unit 140 searches for the shortest path extending from the start node $n_s$ to the destination node $n_d$ in the topology produced in step S33. Then, the path determination unit 140 calculates a second reference value per unit distance on the basis of the distance of the above shortest path in the topology produced in step S33, for example, by division of the central value of the tolerance range of the accumulated dispersion at the destination node by the distance of the above shortest path in the topology produced in step S33. At this time, the coefficient as mentioned in step S13 in the first path determination method for adjusting the accumulated dispersion per unit distance is unnecessary.

<Step S35a> The path determination unit 140 calculates an average of the first reference value per unit distance calculated in step S32a and the second reference value per unit distance calculated in step S34a, and defines the average value as the reference value per unit distance (the reference value for the accumulated dispersion per unit distance).

As explained above, according to the sixth path determination method, similarly to the first path determination method, it is possible to select a path in which the accumulated dispersion after dispersion compensation linearly and slowly increases (or decreases). In addition, the accumulated dispersion in the selected path can become excessively great (i.e., exceed the upper limit of the tolerance range) in the first path determination method, and can become excessively small (i.e., fall below the lower limit of the tolerance range) in the fifth path determination method. However, the sixth path determination method is effective at suppressing occurrence of such situations.

Further, even in the sixth path determination method, it is possible to search for the optimal path by mixed-integer programming as explained in the second path determination method. Furthermore, the optimal path may be determined on the basis of the dispersion error sum in each path as explained for the third path determination method.

2.13 Seventh Path Determination Method

According to the seventh path determination method, a plurality of link-disjoint paths are searched for, and a reference value per unit distance is calculated by using the distances of the plurality of paths. When no pair of paths among a plurality of paths share an identical link, the plurality of paths are said to be link disjoint. (The link means the span in path search.) For example, Ramesh Bhandari, "Optimal Physical Diversity Algorithms and Survivable Networks," Proceedings of the 2nd IEEE Symposium on Computers and Communications (ISCC '97) July 1997 discloses a technique for searching for link-disjoint paths.

Figure 19:
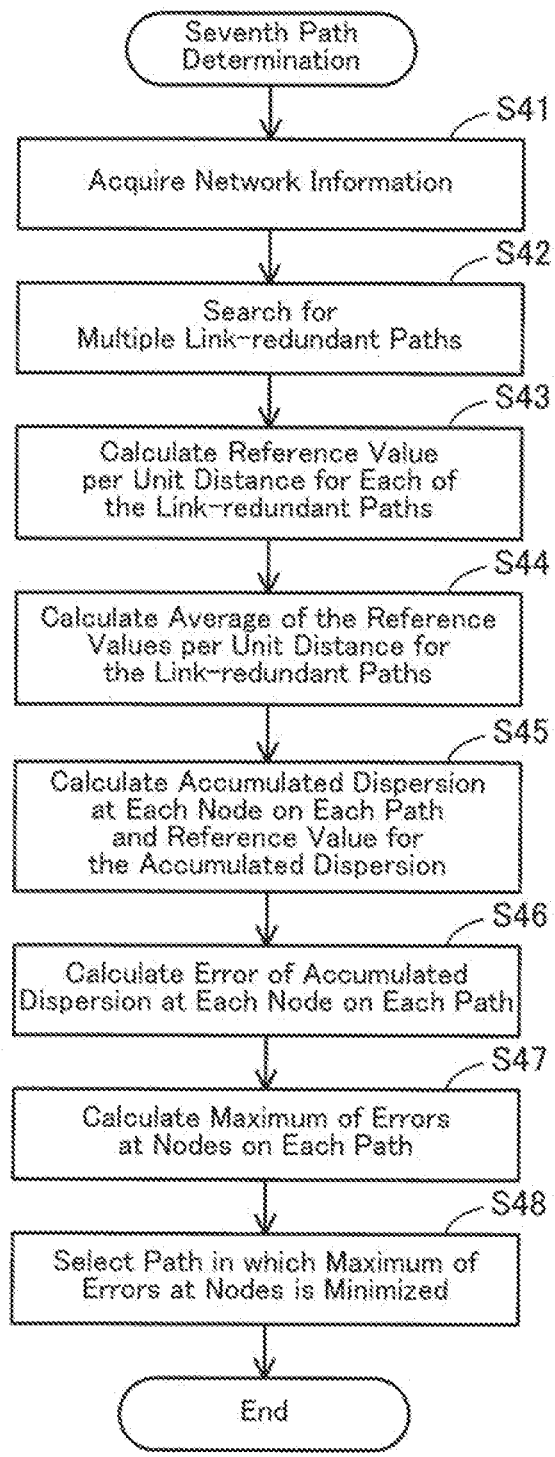
FIG. 19 is a flow diagram of a seventh path determination method.

FIG. 19 is a flow diagram of the seventh path determination method. The processing of FIG. 19 is explained below step by step.

<Step S41> The path determination unit 140 acquires the network information from the network information table 121 stored in the network-information storage 120.

<Step S42> The path determination unit 140 searches for a plurality of link-disjoint paths on the basis of the connections between nodes indicated by the network information. At this time, the path determination unit 140 may extract all paths having a link-disjoint relationship with each other, or the number of the extracted paths may be limited to a predetermined upper limit. In the latter case, link-disjoint paths having relatively small distances may be extracted from among all the link-disjoint paths.

<Step S43> The path determination unit 140 calculates a reference value per unit distance for each of the link-disjoint paths determined in step S42. The reference value per unit distance is defined, for example, by division of the central value of the tolerance range of the accumulated dispersion at the destination node by the distance of each of the link-disjoint paths determined in step S42. The coefficient as mentioned in step S13 in the first path determination method for adjusting the accumulated dispersion per unit distance is unnecessary in the seventh path determination method.

<Step S44> The path determination unit 140 calculates an average of the reference values per unit distance for the link-disjoint paths calculated in step S43.

<Step S45> The path determination unit 140 enumerates all the paths each extending from the start node to the destination node. Then, the path determination unit 140 calculates the accumulated dispersion (after compensation) at each node on each of the enumerated paths. In addition, the path determination unit 140 calculates a reference value for the accumulated dispersion at each node by using the average of the reference values per unit distance which is calculated in step S44.

<Step S46> The path determination unit 140 calculates the accumulated dispersion error at each node on each of the enumerated paths. The accumulated dispersion error is the deviation of the accumulated dispersion from the reference value for the accumulated dispersion.

<Step S47> The path determination unit 140 calculates the maximum accumulated dispersion error in each of the enumerated paths on the basis of the accumulated dispersion errors calculated in step S46.

<Step S48> The path determination unit 140 selects as an optimal path one of the enumerated paths which has the smallest one of the maximum accumulated dispersion errors calculated in step S47. In the case where more than one path has the smallest one of the maximum accumulated dispersion errors, it is possible to select all of the more than one path as optimal paths, or select the shortest one of the more than one path as the optimal path.

Figure 20:
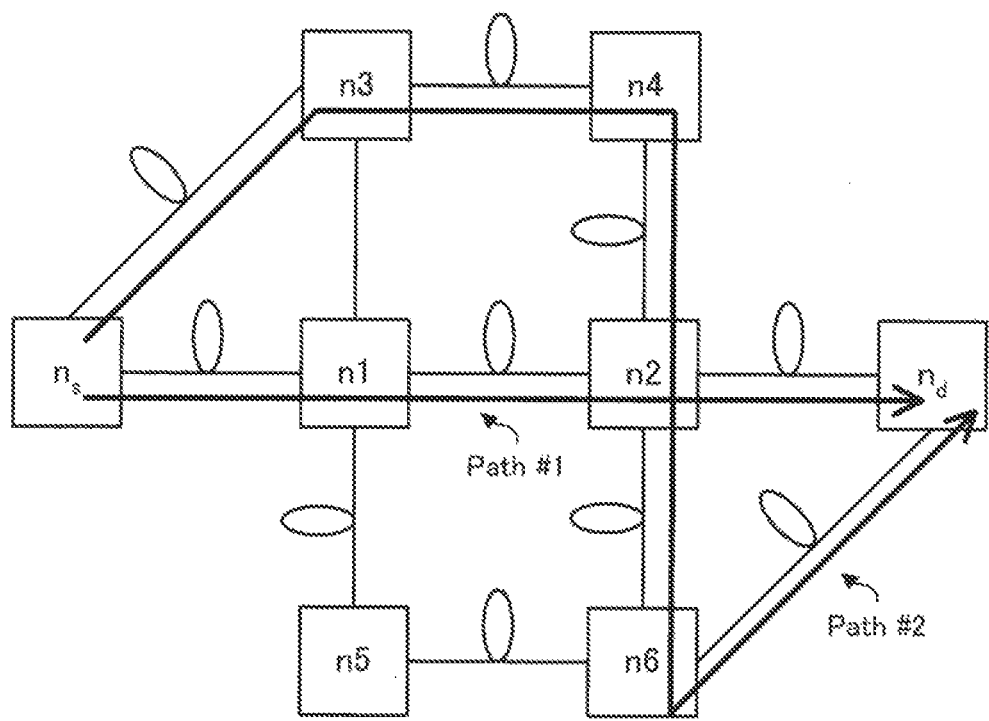
FIG. 20 indicates examples of link-disjoint paths.

FIG. 20 indicates examples of link-disjoint paths. In the topology indicated in FIGS. 6 and 7, two links have their input points at the start node, and two links have their output points at the destination node. Therefore, in this topology, at most two link-disjoint paths can exist. In FIG. 20, two examples of link-disjoint paths, one is the path which starts from the start node $n_s$, passes through the nodes n1 and n2 in this order, and reaches the destination node $n_d$, and the other is the path which starts from the start node $n_s$, passes through the nodes n3, n4, n2, and n6 in this order, and reaches the destination node $n_d$.

As explained above, according to the seventh path determination method, similarly to the first path determination method, it is possible to select a path in which the accumulated dispersion after dispersion compensation linearly and slowly increases (or decreases). In addition, since the reference value per unit distance is calculated on the basis of the distances of link-disjoint paths, it is possible to easily set the reference value per unit distance at an appropriate level.

Further, even in the seventh path determination method, it is possible to search for the optimal path by mixed-integer programming as explained in the second path determination method. Furthermore, the optimal path may be determined on the basis of the dispersion error sum in each path as explained for the third path determination method.

2.14 Eighth Path Determination Method

According to the seventh path determination method, a plurality of link-disjoint paths are searched for, and the reference value per unit distance is calculated on the basis of the distances of the plurality of link-disjoint paths. On the other hand, according to the eighth path determination method, a plurality of node-disjoint paths are searched for, and the reference value per unit distance is calculated on the basis of the distances of the plurality of node-disjoint paths. When no pair of paths among a plurality of paths pass through an identical node, the plurality of paths are said to be node disjoint. For example, Ramesh Bhandari, "Optimal Physical Diversity Algorithms and Survivable Networks," Proceedings of the 2nd IEEE Symposium on computers and communications (ISCC '97) July 1997 also discloses a technique for searching for node-disjoint paths.

Figure 21:
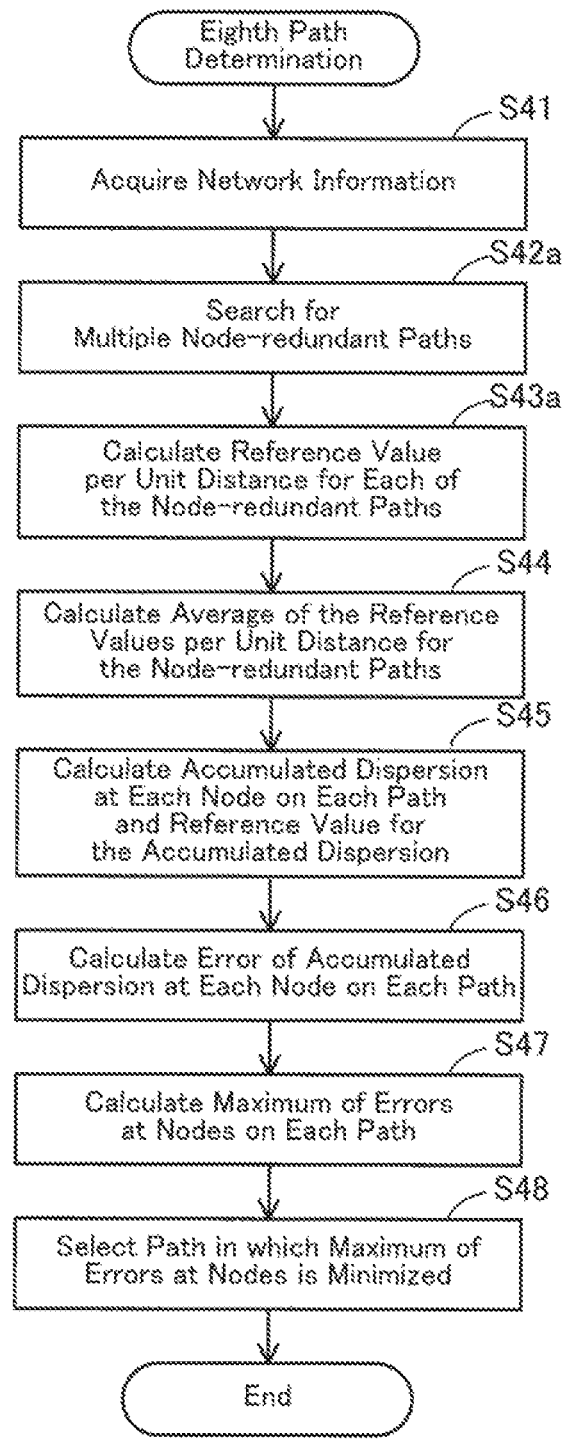
FIG. 21 is a flow diagram of an eighth path determination method.

FIG. 21 is a flow diagram of the eighth path determination method. The eighth path determination method is different from the seventh path determination method in that steps S42a and S43a indicated in FIG. 21, instead of steps S42 and S43 indicated in FIG. 19 for the seventh path determination method, are executed.

<Step S42a> The path determination unit 140 searches for a plurality of node-disjoint paths on the basis of the connections between nodes indicated by the network information. At this time, the path determination unit 140 may extract all paths having a node-disjoint relationship with each other, or the number of the extracted paths may be limited to a predetermined upper limit. In the latter case, node-disjoint paths having relatively small distances may be extracted from all the node-disjoint paths.

<Step S43a> The path determination unit 140 calculates a reference value per unit distance for each of the node-disjoint paths determined in step S42a. The reference value per unit distance is defined, for example, by division of the central value of the tolerance range of the accumulated dispersion at the destination node by the distance of each path determined in step S42a. In the eighth path determination method, the coefficient as mentioned in step S13 in the first path determination method for adjusting the accumulated dispersion per unit distance is unnecessary.

Figure 22:
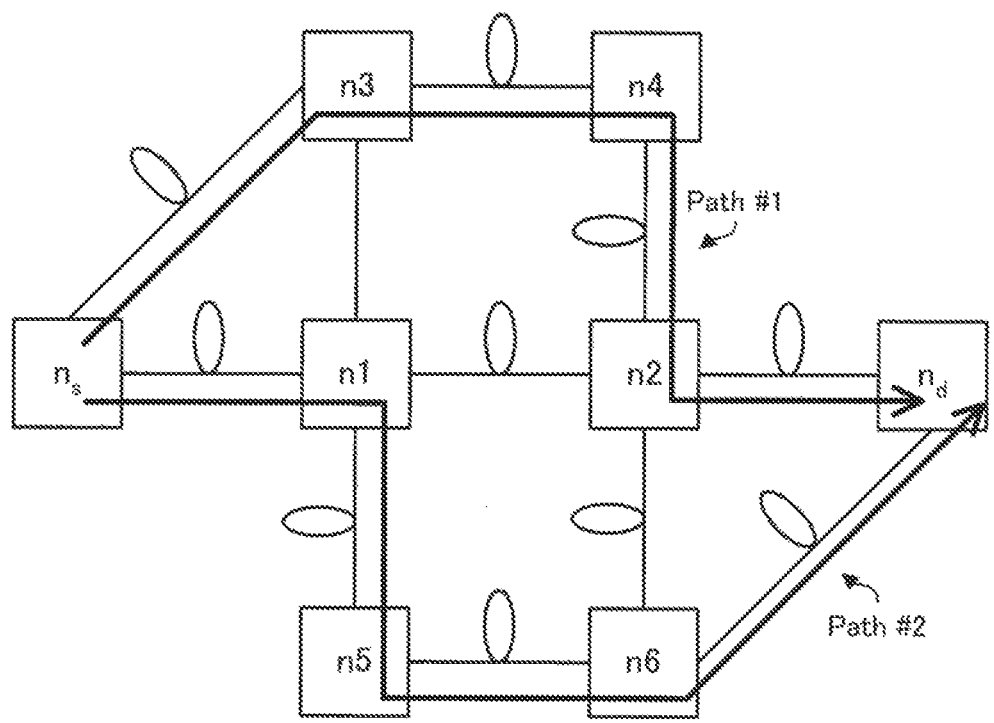
FIG. 22 indicates examples of node-disjoint paths.

FIG. 22 indicates examples of node-disjoint paths. In the topology indicated in FIGS. 6 and 7, at most two node-disjoint paths can exist. In FIG. 22, two examples of node-disjoint paths, one is the path which starts from the start node $n_s$, passes through the nodes n3, n4, and n2 in this order, and reaches the destination node $n_d$, and the other is the path which starts from the start node $n_s$, passes through the nodes n1, n5, and n6 in this order, and reaches the destination node $n_d$.

As explained above, according to the eighth path determination method, similarly to the first path determination method, it is possible to select a path in which the accumulated dispersion after dispersion compensation linearly and slowly increases (or decreases). In addition, since the reference value per unit distance is calculated on the basis of the distances of node-disjoint paths, it is possible to easily set the reference value per unit distance at an appropriate level. Since the constraints for searching for node-disjoint paths are severer than the constraints for searching for link-disjoint paths, there is a tendency that the node-disjoint paths are longer than the link-disjoint paths. Therefore, the reference value per unit distance calculated in the eighth path determination method is likely to be smaller than the reference value per unit distance calculated in the seventh path determination method.

Further, even in the eighth path determination method, it is possible to search for the optimal path by mixed-integer programming as explained in the second path determination method. Furthermore, the optimal path may be determined on the basis of the dispersion error sum in each path as explained for the third path determination method.

2.15 Ninth Path Determination Method

According to the ninth path determination method, a plurality of link-disjoint paths are searched for, and the reference value per unit distance is calculated on the basis of the distances of the plurality of link-disjoint paths as in the seventh path determination method. However, the ninth path determination method is different from the seventh path determination method in the manner of determination of the reference value per unit distance.

Figure 23:
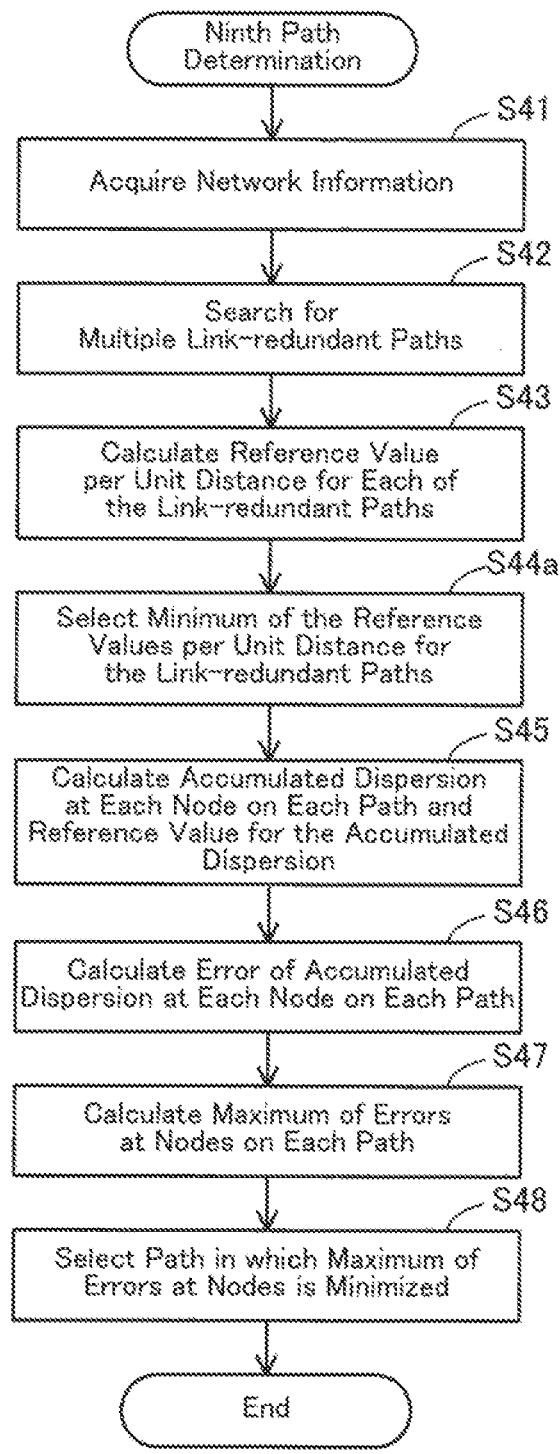
FIG. 23 is a flow diagram of a ninth path determination method.

FIG. 23 is a flow diagram of the ninth path determination method. The ninth path determination method is different from the seventh path determination method in that step S44a indicated in FIG. 23, instead of steps step S44 indicated in FIG. 19 for the seventh path determination method, is executed.

<Step S44a> The path determination unit 140 selects the smallest one of the reference values per unit distance in the link-disjoint paths calculated in step S43, instead of obtaining an average of the reference values per unit distance. Thereafter, the selected reference value per unit distance is used in step S45 for calculating the reference value for the accumulated dispersion at each node.

As explained above, according to the ninth path determination method, similarly to the first path determination method, it is possible to select a path in which the accumulated dispersion after dispersion compensation linearly and slowly increases (or decreases). In addition, it is possible to easily set the reference value per unit distance at an appropriate level. Since the smallest one of the reference values per unit distance in the link-disjoint paths, instead of the average of the reference values per unit distance, is selected, the reference value per unit distance in the ninth path determination method is basically smaller than the reference value per unit distance in the seventh path determination method.

Further, even in the ninth path determination method, it is possible to search for the optimal path by mixed-integer programming as explained in the second path determination method. Furthermore, the optimal path may be determined on the basis of the dispersion error sum in each path as explained for the third path determination method.

2.16 Tenth Path Determination Method

According to the tenth path determination method, a plurality of node-disjoint paths are searched for, and the reference value per unit distance is calculated on the basis of the distances of the plurality of node-disjoint paths as in the eighth path determination method. However, the tenth path determination method is different from the eighth path determination method in the manner of determination of the reference value per unit distance.

Figure 24:
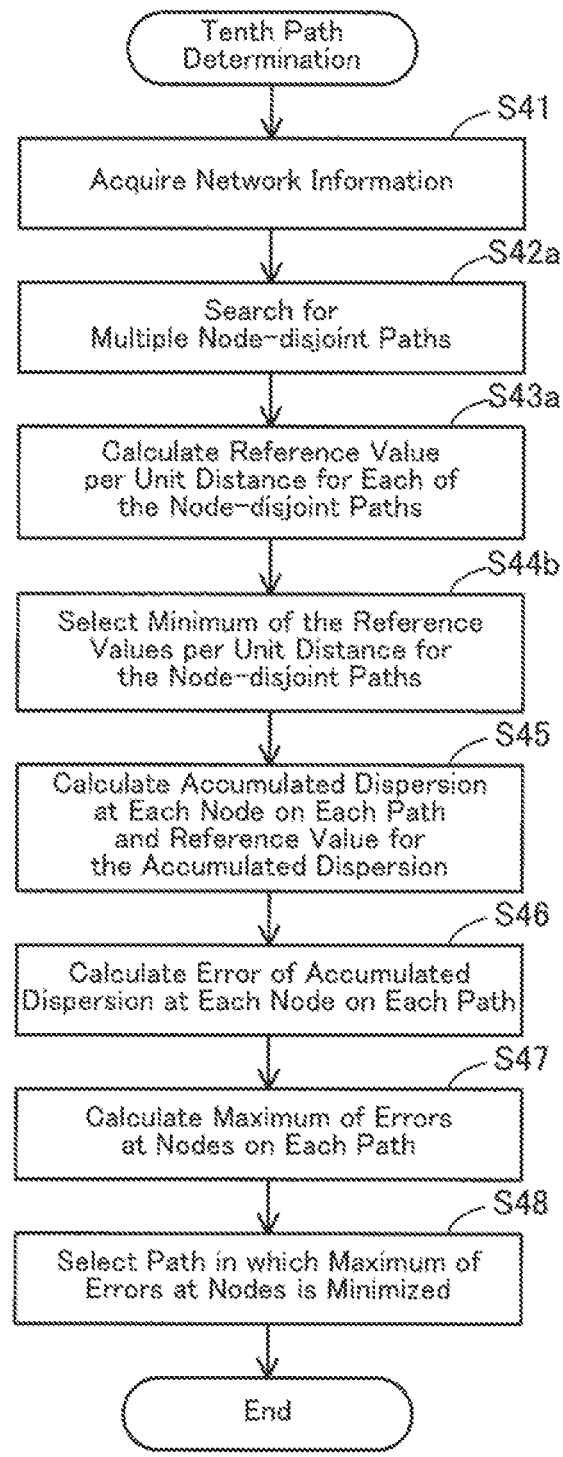
FIG. 24 is a flow diagram of a tenth path determination method.

FIG. 24 is a flow diagram of the tenth path determination method. The tenth path determination method is different from the eighth path determination method in that step S44b indicated in FIG. 24, instead of steps step S44 indicated in FIG. 21 for the eighth path determination method, is executed.

<Step S44b> The path determination unit 140 selects the smallest one of the reference values per unit distance in the node-disjoint paths calculated in step S43a, instead of obtaining an average of the reference values per unit distance. Thereafter, the selected reference value per unit distance is used in step S45 for calculating the reference value for the accumulated dispersion at each node.

As explained above, according to the tenth path determination method, similarly to the first path determination method, it is possible to select a path in which the accumulated dispersion after dispersion compensation linearly and slowly increases (or decreases). In addition, it is possible to easily set the reference value per unit distance at an appropriate level. Since the smallest one of the reference values per unit distance in the node-disjoint paths, instead of the average of the reference values per unit distance, is selected, the reference value per unit distance in the tenth path determination method is basically smaller than the reference value per unit distance in the eighth path determination method.

Further, even in the tenth path determination method, it is possible to search for the optimal path by mixed-integer programming as explained in the second path determination method. Furthermore, the optimal path may be determined on the basis of the dispersion error sum in each path as explained for the third path determination method.

2.17 Advantages of Second Embodiment

When the network design apparatus 10 according to the second embodiment explained above is used, it is possible to select a path in which distortion of optical signals can be suppressed, and improve the transmission quality of the optical network. That is, according to the second embodiment, it is possible to select a path in which the accumulated dispersion is close to the reference amount not only at the destination node and also at intermediate nodes. Therefore, the nonlinear distortion which can be caused when the accumulated dispersion is extremely great or close to zero at intermediate nodes can be suppressed. In addition, the network design apparatus 10 can determine the optimal path by using a plurality of path determination methods, and can therefore flexibly perform path selection according to the size, topology, transmission characteristics, and other factors.

The apparatus according to the above aspect of the present invention, as well as a process and a program for designing of an optical network which are executed in the apparatus, can select a path in which distortion of optical signals can be suppressed.

According to the present invention, it is possible to optimumly design an optical network having desired characteristics.

3. Recording Medium Storing Program

The processing functions of the network design apparatus 10 explained above can be realized by a computer. In this case, a program describing details of processing for realizing the functions which the network design apparatus 10 should have is provided. When a computer executes the program, the processing functions of the network design apparatus 10 can be realized on the computer.

The program describing the details of the processing can be stored in a recording medium which can be read by the computer (e.g., the aforementioned portable recording medium 16a). The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a CD-ROM (Compact Disk-Read Only Memory), a CD-R (Recordable)/RW (ReWritable), a DVD (Digital Versatile Disk), a DVD-R (Recordable)/RW (ReWritable), or the like.

In order to put the program into the market, for example, it is possible to sell a portable recording medium in which the program is recorded. Alternatively, it is possible to store the program in a storage device belonging to another computer, and transfer the program to the network design apparatus 10 through a network.

When the program is originally recorded, for example, in a portable recording medium, or is initially transferred from another computer to the network design apparatus 10, the network design apparatus 10, for example, stores the program in a storage device (e.g., the aforementioned HDD 13) belonging to the network design apparatus 10. Then, the network design apparatus 10 reads the program from the storage device, and performs processing in accordance with the program. Alternatively, the network design apparatus 10 can directly read the program from the portable recording medium for performing processing in accordance with the program. Further alternatively, the network design apparatus 10 can sequentially execute processing in accordance with each portion of the program every time the portion of the program is transferred from the another computer.

4. Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions and alterations could be made hereto without departing from the spirit and scope of the invention.

What is claimed is:

1. An apparatus for supporting designing of an optical network including a plurality of nodes and a plurality of links which connect the plurality of nodes, comprising:
a storage which stores information indicating distances of the plurality of links and information indicating amounts of chromatic dispersion in the plurality of links; and
a path selection unit which selects a path for use in transmission of an optical signal, from among a plurality of paths each extending from a start node to a destination node, by reference to said storage;
wherein said path selection unit selects said path on the basis of deviations of amounts of chromatic dispersion accumulated by transmission to respective nodes on each of the plurality of paths, from reference amounts at the respective nodes on said each of the plurality of paths, and the reference amounts at the respective nodes on said each of the plurality of paths are determined according to distances from the start node to the respective nodes on said each of the plurality of paths.

2. The apparatus according to claim 1, wherein said reference amounts are calculated on the basis of the distances from the start node to said respective nodes on said each of the plurality of paths and a reference amount per unit distance.

3. The apparatus according to claim 2, wherein said path selection unit determines said reference amount per unit distance on the basis of an amount of chromatic dispersion which is accumulated by transmission from said start node to said destination node through a shortest path.

4. The apparatus according to claim 2, wherein said path selection unit selects a path which contains no link contained in a shortest path, from among said plurality of paths, and determines said reference amount per unit distance on the basis of an amount of chromatic dispersion which is accumulated by transmission from said start node to said destination node through the path which contains no link contained in the shortest path.

5. The apparatus according to claim 2, wherein said path selection unit calculates a first reference amount on the basis of an amount of chromatic dispersion which is accumulated by transmission from said start node to said destination node through a shortest path, selects another path which contains no link contained in the shortest path, from among said plurality of paths, calculates a second reference amount on the basis of an amount of chromatic dispersion which is accumulated by transmission from the start node to the destination node through said another path, and determines said reference amount per unit distance on the basis of the first reference amount and the second reference amount.

6. The apparatus according to claim 2, wherein said path selection unit selects two or more link-disjoint paths from among said plurality of paths, and determines said reference amount per unit distance on the basis of an amount of chromatic dispersion which is accumulated by transmission from said start node to said destination node through each of the two or more link-disjoint paths.

7. The apparatus according to claim 2, wherein said path selection unit selects two or more node-disjoint paths from among said plurality of paths, and determines said reference amount per unit distance on the basis of an amount of chromatic dispersion which is accumulated by transmission from said start node to said destination node through each of the two or more node-disjoint paths.

8. The apparatus according to claim 1, wherein said path selection unit calculates said deviations on said each of all of the plurality of paths, and selects said path for use in transmission of the optical signal on the basis of the calculated deviations.

9. The apparatus according to claim 1, wherein said path selection unit calculates a deviation of an amount of chromatic dispersion caused by transmission through each of said plurality of links from a link-based reference amount determined according to a distance of said each of the plurality of links, and searches, on the basis of said difference, for a path in which said deviations satisfy a predetermined condition.

10. The apparatus according to claim 1, wherein said path selection unit selects a maximum of said deviations on said each of the plurality of paths, and selects as said path for use in transmission of the optical signal one of said plurality of paths in which said maximum is minimized.

11. The apparatus according to claim 1, wherein said path selection unit calculates a sum of absolute values of said deviations on said each of the plurality of paths, and selects as said path for use in transmission of the optical signal one of said plurality of paths in which said sum is minimized.

12. The apparatus according to claim 1, wherein said information indicating the amounts of chromatic dispersion contains information indicating amounts of chromatic dispersion caused by transmission of the optical signal through optical fibers and information indicating amounts of chromatic dispersion compensated for at ends of the optical fibers by chromatic dispersion compensation.

13. A process for designing an optical network including a plurality of nodes and a plurality of links which connect the plurality of nodes, performed in an apparatus for supporting designing of the optical network, comprising:
acquiring, from a storage, information indicating distances of the plurality of links and information indicating amounts of chromatic dispersion in the plurality of links; and
selecting a path for use in transmission of an optical signal, from among a plurality of paths each extending from a start node to a destination node, on the basis of said information acquired from said storage,
wherein in said selecting, said path is selected on the basis of deviations of amounts of chromatic dispersion accumulated by transmission to respective nodes on each of the plurality of paths, from reference amounts at the respective nodes on said each of the plurality of paths, and the reference amounts at the respective nodes on said each of the plurality of paths are determined according to distances from the start node to the respective nodes on said each of the plurality of paths.

14. A computer-readable, non-transitory medium storing a network design program for supporting designing of an optical network including a plurality of nodes and a plurality of links which connect the plurality of nodes, said network design program makes a computer perform a process comprising:
acquiring from a storage information indicating distances of the plurality of links and information indicating amounts of chromatic dispersion in the plurality of links; and
selecting a path for use in transmission of an optical signal, from among a plurality of paths each extending from a start node to a destination node, on the basis of said information acquired from said storage,
wherein in said selecting, said path is selected on the basis of deviations of amounts of chromatic dispersion accumulated by transmission to respective nodes on each of the plurality of paths, from reference amounts at the respective nodes on said each of the plurality of paths, and the reference amounts at the respective nodes on said each of the plurality of paths are determined according to distances from the start node to the respective nodes on said each of the plurality of paths.

* * * * *